United States Patent [19]

Kamata et al.

[11] Patent Number: 5,408,261
[45] Date of Patent: Apr. 18, 1995

[54] METHOD AND APPARATUS FOR CONTROLLING IMAGE COMMUNICATION BETWEEN A PLURALITY OF TERMINALS AND AN EXCHANGE

[75] Inventors: Hajime Kamata; Masayuki Ozawa; Kenichi Ohzasa, all of Kawasaki, Japan

[73] Assignee: Fujitsu Limited, Kanagawa, Japan

[21] Appl. No.: 115,350

[22] Filed: Sep. 1, 1993

[30] Foreign Application Priority Data

Mar. 1, 1993 [JP] Japan .................. 5-040169

[51] Int. Cl.⁶ .................. H04N 7/15; H04N 7/14
[52] U.S. Cl. .................. 348/15; 348/17; 348/10; 348/581; 348/588
[58] Field of Search .................. 358/85, 86, 180, 183, 358/181; 379/53, 54, 202, 90; H04N 7/12, 7/14, 7/15; 370/62; 348/15, 16, 17, 19, 18, 14, 13, 20, 6, 10, 12, 581, 580, 588, 584, 598, 552, 705, 582

[56] References Cited

U.S. PATENT DOCUMENTS

| | | | |
|---|---|---|---|
| 4,650,929 | 3/1987 | Boerger et al. | 358/86 |
| 4,953,159 | 8/1990 | Hayden et al. | 370/62 |
| 4,987,492 | 1/1991 | Stults et al. | 358/181 |
| 4,995,071 | 2/1991 | Weber et al. | 379/53 |
| 4,996,592 | 2/1991 | Yoshida | 358/85 |
| 5,157,491 | 10/1992 | Kassatly | 358/85 |

FOREIGN PATENT DOCUMENTS

| | | | |
|---|---|---|---|
| 2125588 | 5/1990 | Japan | H04N 7/15 |
| 4042687 | 2/1992 | Japan | H04N 7/15 |

*Primary Examiner*—James J. Groody
*Assistant Examiner*—Safet Metjahic

[57] ABSTRACT

A method and apparatus for performing image communication between a plurality of terminals are suggested, in which a composing unit is provided for composing a signal transmitted from a predetermined number of terminals at the transmitting side, together with destination information, into one image signal. An encoding unit encodes the composite signal composed by the composing unit. The composite signal encoded at the encoding unit is transmitted to the receiving side through an exchange at the transmitting side.

25 Claims, 24 Drawing Sheets

METHOD AND APPARATUS FOR CONTROLLING IMAGE COMMUNICATION BETWEEN A PLURALITY OF TERMINALS AND AN EXCHANGE

(1) INDUSTRIAL APPLICATION FIELD

This invention relates to a method and an apparatus for controlling image communication to effectively transmit image signal transmitted and received among terminals.

(2) PRIOR ARTS

In recent years, in the field of communication, a visual telephone and the like have been developed for transmitting and receiving image signals as well as sounds.

Image communication is achieved through a network connected with a plurality of image terminal devices each of which having a camera, an image codec device, a personal computer and a display. An entire structure of an image communication network is shown in FIG. 24.

An image terminal device 100 comprises, as described above, a display 100a, a camera 100b, an image codec device 100c, and a personal computer (or a workstation) 100d.

The image terminal device 100 is connected to a network 300 through a private branch exchange 200.

The camera 100a in the image terminal device 100 is a device for picking up an image of the problem domain to enter image signal into the own image terminal device 100.

The image codec device 100c has a function to encode image signal entered by the camera 100a for transmitting the same and a function to decode image signal supplied from the private branch exchange 200 on receiving it.

The personal computer 100d comprises a video card 110 and a communication card 120. The communication card 120 has a function to transmit and receive signal to and from the private branch exchange 200.

The video card 110 has a function to display the decoded image signal on the display 100a. More particularly, the video card 110 has a window function to display said image signal on a given display region on the display 100a.

In this event, for transmitting the image signal from the above mentioned image terminal device 100, the camera 100b enters image signal of the problem domain. Here, said problem domain is assumed to be a transmitting subscriber.

The camera 100b supplies the picked up image signal (a picked up image of the transmitting subscriber) to the image codec device 100c.

The image codec device 100c encodes the image signal in question to transfer the same to the communication card 120.

The communication card 120 transmits to the private branch exchange 200 the image signal in question and an address in the directed terminal for this image signal.

The private branch exchange 200 determines, in accordance with said address, the private branch exchange network in which the directed image communication terminal 100 is included to transmit said image signal to that private branch exchange network.

The private branch exchange 200 in the directed private branch exchange network determines, in accordance with said address, a destination of said image signal to transmit the same to the image terminal device 100 indicated by the destination.

The directed image terminal device 100 receives the image signal in question through the communication card 120. The communication card 120 transfers the received image signal to the image cordic device 100c.

The image cordic device 100c decodes the image signal. Further, the image cordic device 100c supplies the decoded image signal to the video card 110.

The video card 110 displays said image signal on a given display region on the display 100a.

By the way, in case of image communication, the amount of information is larger than the sound or the like and it is necessary to assign one high-speed communication line for a single image signal to achieve real-time image communication.

In addition, the resolution of the image signal defined by NTSC (National Television System Committee) is of the order of $640 \times 480$ while the resolution of the image signal defined by CIF (Common Image Format) of H 261 is of the order of $352 \times 288$.

On the other hand, the displayable resolution of personal computers or workstations ranges from about $640 \times 400$ to $1000 \times 1000$. Accordingly, for image communication, one or two image signal displayed on a window occupy a significant portion of the display screen. With this respect, conventional methods reduce the received image signal to the resolution of $160 \times 120$ or so before display the same on the display device. More particularly, the resolution of the reduced screen is registered. On receiving image signal, the video card reduces the image signal to the registered resolution and supplies it to the display.

Further, above mentioned image cordic device is disadvantageous in that it is expensive and implementation thereof in every one image terminal device increases cost of communication.

In addition, since the image signal occupies the high-speed communication lines on transmission and is reduced at the receiving side, the high-speed communication lines are occupied in vain and less efficient.

Further, typical video cards have only a function to display single image signal on a given display region and are unable to displaying on a window two or more image signal. An exclusive video card is thus required dividely to display simultaneously the image signal of the communication partner(s) and the image signal picked up through the own image terminal device.

The present invention is directed to overcome the above mentioned problems and objects thereof are to improve operational efficiency of the high-speed communication line and to make it possible to display on a window two or more image signal without modifying structure of the terminal.

SUMMARY OF THE INVENTION

The present invention is a method and an apparatus which are useful for effectively performing image communication and is a method and an apparatus for composing a predetermined number of image signal to transmit the same through a single high-speed communication line.

First, a method for controlling image communication is described in a time sequential manner.

First, a terminal at the transmitting side carries out:

(1) an image pick-up step for picking up an image of a given problem domain to enter image signal into the own terminal; and (2) a communication processing step for transmitting the image signal entered at the image pick-up step.

Next, an exchange network at the transmitting side carries out:

(3) a composing step for composing the image signal transmitted from a predetermined number of terminals including said terminal at the transmitting side;

(4) an encoding step for encoding the composite signal generated at the compositing step; and (5) a transmitting step for transmitting the composite signal encoded at the encoding step to the receiving side through the exchange.

In the exchange network at the receiving side a step included is a step of determining, in response to a call request from a certain terminal, whether the number of terminals under the communication state other than that terminal reaches a predetermined number. If the number of terminals under the communication state is less than the predetermined number, it accepts the call request from said terminal and composes the image signal from said terminal and the image signal from the terminals under the communication state to transmit the same to the receiving side.

In this event, it includes a step of setting a call to the receiving side if there is no terminal under the communication state.

The exchange network at the receiving side carries out:

(6) a decoding step for decoding the composite signal transmitted from the transmitting side;

(7) a destination determining step for determining a destination of the respective image signal in the decoded composite signal in accordance with destination information transmitted with the composite signal; and (8) a transmitting step for transmitting the composite signal to the respective destination terminals determined at the destination determining step.

Then, each destination terminal carries out:

(9) a communication processing step for receiving the composite signal transmitted from the transmitting side;

(10) an image signal extracting step for extracting from the composite signal the image signal directed to the own terminal; and

(11) a displaying step for displaying the image signal extracted at the image signal extracting step on a given region on a display screen.

As a result, a predetermined number of image signal can be transmitted through a single high-speed communication line. In addition, it becomes possible to commonly share with a plurality of terminals a device such as a cordic device for encoding and decoding.

The exchange network at the receiving side may carry out, after execution of the decoding step,

(70) a dividing step for dividing the composite signal decoded at the decoding step into each image signal;

(80) a destination determining step for determining a destination of the respective image signal divided at the dividing step; and

(90) a transmitting step for transmitting each image signal to the destination determined at the destination determining step. In this event, each of the destination terminals is capable of displaying immediately on a screen the image signal directed to the own terminal.

In addition, the composing step may comprise steps of dividing the image signal into a predetermined number of equal screen regions; reducing a resolution of the respective image which predetermined number of terminals picked up to a resolution of said screen region; and write the reduced image signal into said respective screen region to generate a composite signal having the same resolution as the single image signal before reduction. In this event, the transmitting step of said (8) preferably comprises the step of transmitting to the respective terminals the composite signal and identification information for use in identifying the screen region of the image signal directed to the respective terminals. As a result of this, in the image signal extracting step of said (10), the image signal directed to the own terminal can be extracted in accordance with said identification information. Said identification information is, for example, information indicating the screen region of the respective image signal in the composite signal.

When a terminal-a displays the image signal of a directed terminal-b at the smaller resolution than the resolution reduced at the composing step, a step may be included for transmitting a desired reduction rate to the network which includes terminal-b. In such a case, the network which includes terminal-b carries out the step of reducing the image signal picked up by the terminal-b at the reduction rate transmitted from the terminal-a to compose it with the image signal of other terminals which are included in the own network.

In addition, before the image pick-up step of said (1), the terminal at the transmitting side carries out the step of transmitting a call request. Then, the exchange network at the transmitting side carries out the steps of determining whether the number of terminals under the communication state other than that terminal reaches a predetermined number; and setting a call for the receiving side if there is no terminal under the communication state.

In addition, if a predetermined number of terminals other than said transmitting terminal are under the communication state, the call request from said transmitting terminal is not accepted. More particularly, the composing step of said (3) is unable to composing the image signal over the predetermined number. For example, when the composing step can compose four image signal at maximum and four terminals at the transmitting side are under the communication state, the call request transmitted from the fifth transmitting terminal is not accepted.

In response to a communication completion notification from a terminal at the transmitting side, the transmitting side carries out steps of determining whether there is any terminal under the communication state other than the transmitting terminal; and disconnecting the call set to the receiving side if there is no terminal under the communication state.

Second, an apparatus for controlling image communication according to the present invention is described in conjunction with a principle diagram shown in FIG. 1.

An image communication controlling apparatus is an apparatus for use in realizing the image communication controlling method according to the present invention, in which an image communication processing device 2 is provided between a plurality of terminals and an exchange 3 at each of the transmitting and the receiving sides.

At the transmitting side, the image communication processing device 2 has a function to compose the image signal transmitted from a predetermined number of terminals 1 to generate a composite signal and transmit the composite signal to the receiving side through a single high-speed communication line.

At the receiving side, the image communication processing device 2 has a function to determine the destination of the respective image signal in the composite signal to transmit said composite signal to the respective destination terminals 1.

Described in detail below are the functions of the terminals 1 and the image communication processing devices 2 composing the image communication controlling apparatus according to the present invention.

At the transmitting side, the terminal 1 comprises image pick-up means 1a for picking up an image of a given problem domain to enter an image signal into the terminal 1; and communication processing means 1c for transmitting the image signal supplied from the image pick-up means 1a to the image communication processing device 2 at the transmitting side.

At the transmitting side, the image communication processing device 2 comprises composing means 2c for composing the image signal transmitted form the predetermined number of terminals; encoding means 2a for encoding the composite signal composed of the composing means 2c; and transmitting means 2f for transmitting the composite signal encoded by the encoding means 2a to the receiving side through the exchange 3.

In addition, said composing means 2c may reduce a resolution of the respective image signal. In this event, the composing means 2c divides the resolution of the image signal into a predetermined number of equal screen regions to allocate said respective screen regions to the respective reduced image signal.

The encoding means 2a has a function to encode the composite signal composed by the composing means 2c into a transmission path code.

The transmitting means 2f has a function, along with the above mentioned functions, to set a call and disconnect a call to the image communication processing device at the receiving side. This function includes a function to determine, in response to reception of the call request from a terminal at the transmitting side, whether there is any terminal under the communication state other than that terminal, and a function to set a call for the image communication processing device at the receiving side if there is no terminal under the communication state. In addition, it has a function to determine, when a terminal at the transmitting side receives a communication completion notification, whether there is any terminal under the communication state other than that terminal, and a function to disconnect the call set to the image communication processing device at said receiving side if there is no terminal under the communication state.

Next, at the receiving side, the image communication processing device 2 comprises decoding means 2b for decoding the composite signal transmitted from the transmitting side; destination determining means 2e for determining a destination of the respective image signal in the composite signal decoded by the decoding means 2b; and the transmitting means 2f for transmitting the composite signal to the respective destination terminals determined by the destination determining means 2e.

The decoding means 2b has a function to decode the composite signal encoded into the transmission path code into data which can be processed internally.

The destination determining means 2e determines the destination of the respective image signal in accordance with destination information transmitted together with the composite signal.

The transmitting means 2f transmits to the respective destination terminals identification information for use in identifying the image signal directed to the respective terminals along with the composite signal.

Each of said destination terminals comprises the communication processing means 1c for receiving the composite signal transmitted from the image communication processing device; image signal extracting means 1d for extracting the image signal directed to the own terminal from the composite signal received by the communication processing means 1c; and displaying means 1b for displaying the image signal extracted by the image signal extracting means 1d on a given screen region.

The image signal extracting means 1d extracts only the image signal directed to the own terminal from said composite signal in accordance with the identification information transmitted together with the composite signal.

In addition, the image communication processing device at the receiving side may comprise dividing means 2d for dividing the composite signal into a particular image signal. In such a case, the destination terminal is not required to comprise the image signal extracting means 1d.

BRIEF DESCRIPTION OF THE DRAWINGS

FIG. 7 (B) is a diagram showing a practical example of a composite signal transmitted from a private branch exchange network at the receiving side;

DETAILED DESCRIPTION OF THE PREFERRED EMBODIMENTS

Embodiments of the present invention will be described below.

In this embodiment, in an ISDN formed by connecting a plurality of private branch exchange networks through ISDN lines, an image communication controlling apparatus is described concerning, as an example, especially to two private branch exchange networks, i.e., a private branch exchange network at the transmitting side and a private branch exchange network at the receiving side.

Figure 1:
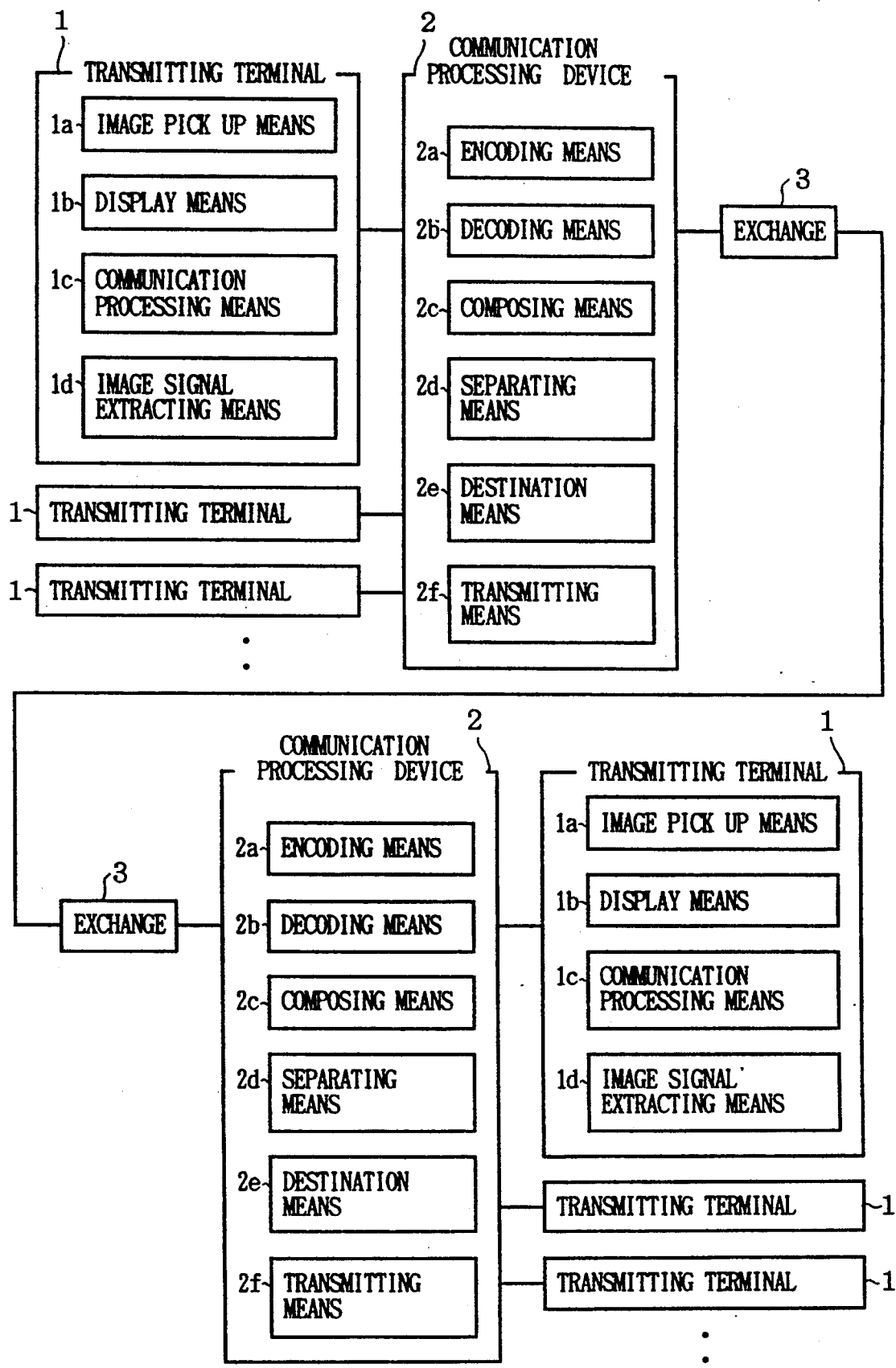
FIG. 1 is a principle diagram of the present invention.
Figure 2:
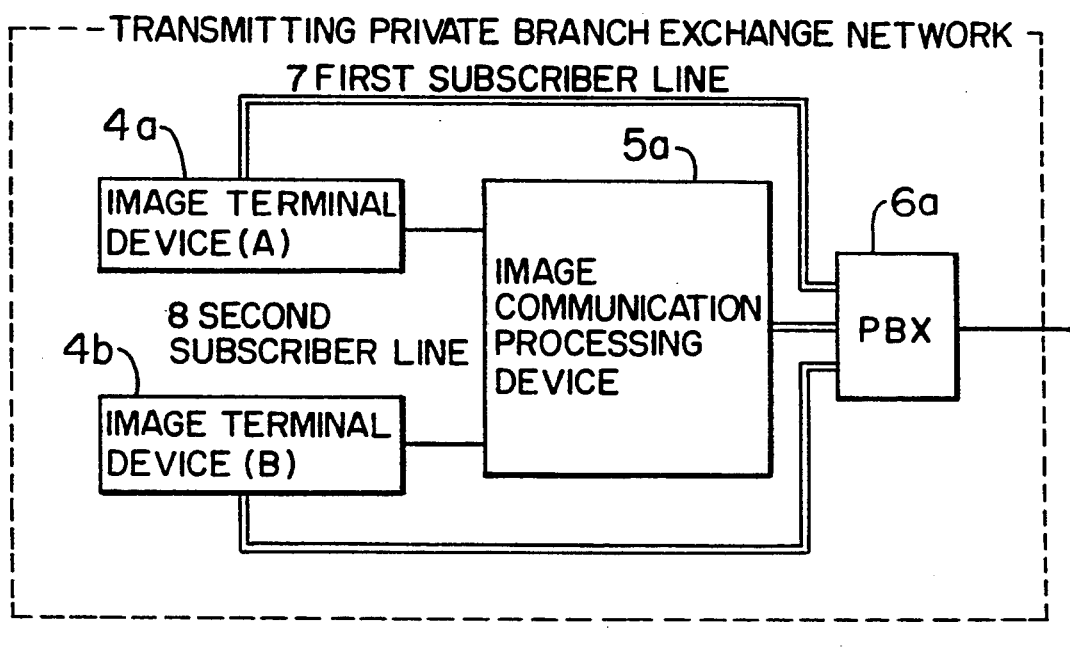
FIG. 2 is an entire schematical structural block diagram of an image communication controlling apparatus according to a first embodiment.
Figure 2:
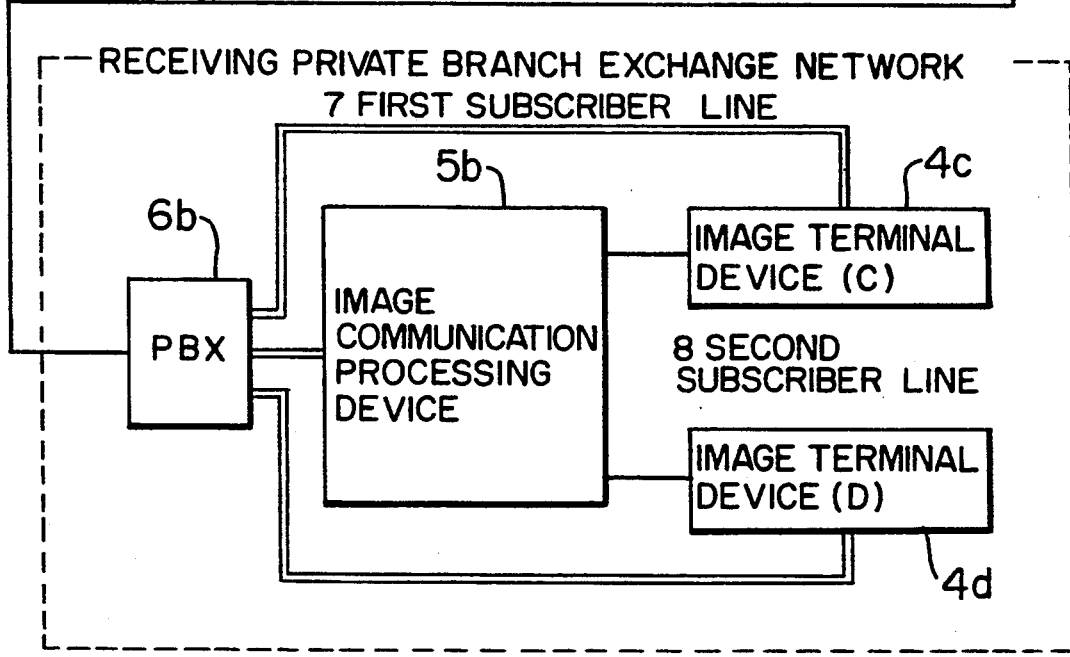

FIG. 2 shows an entire structural block diagram of the image communication controlling apparatus.

In the private branch exchange network at the transmitting side, an image terminal device (A) 4a and an image terminal device (B) 4b are connected to a PBX 6a through an ISDN line (hereinafter referred to as a first subscriber line 7) having 2B+D channel structure. Further, in the private branch exchange network at the transmitting side, an image communication processing device 5a is interposed between the PBX 6a and the image terminal (A) 4a and the image terminal (B) 4b. The image communication processing device 5a and each of the image terminal device (A) 4a and the image terminal device (B) 4b are connected through an analog line (hereinafter referred to as a second subscriber line 8) capable of transmitting only image signal. In addition, the image communication processing device 5a and the PBX 6a are connected through the first subscriber line 7.

In the private branch exchange network at the receiving side, a PBX 6B is connected to an image terminal device (C) 4c and an image terminal device (D) 4d through the first subscriber line 7. Further, in the private branch exchange network at the receiving side, an image communication processing device 5b is interposed between the PBX 6B and the image terminal (C) 4c and the image terminal (D) 4d. The image communication processing device 5a and each of the image terminal device (C) 4c and the image terminal device (D) 4d are connected through the second subscriber line 8. In addition, the image communication processing device 5b and the PBX 6b are connected through the first subscriber line 7.

In addition, the PBX 6a at the transmitting side and the PBX 6b at the receiving side are connected through the ISDN line.

Figure 3:
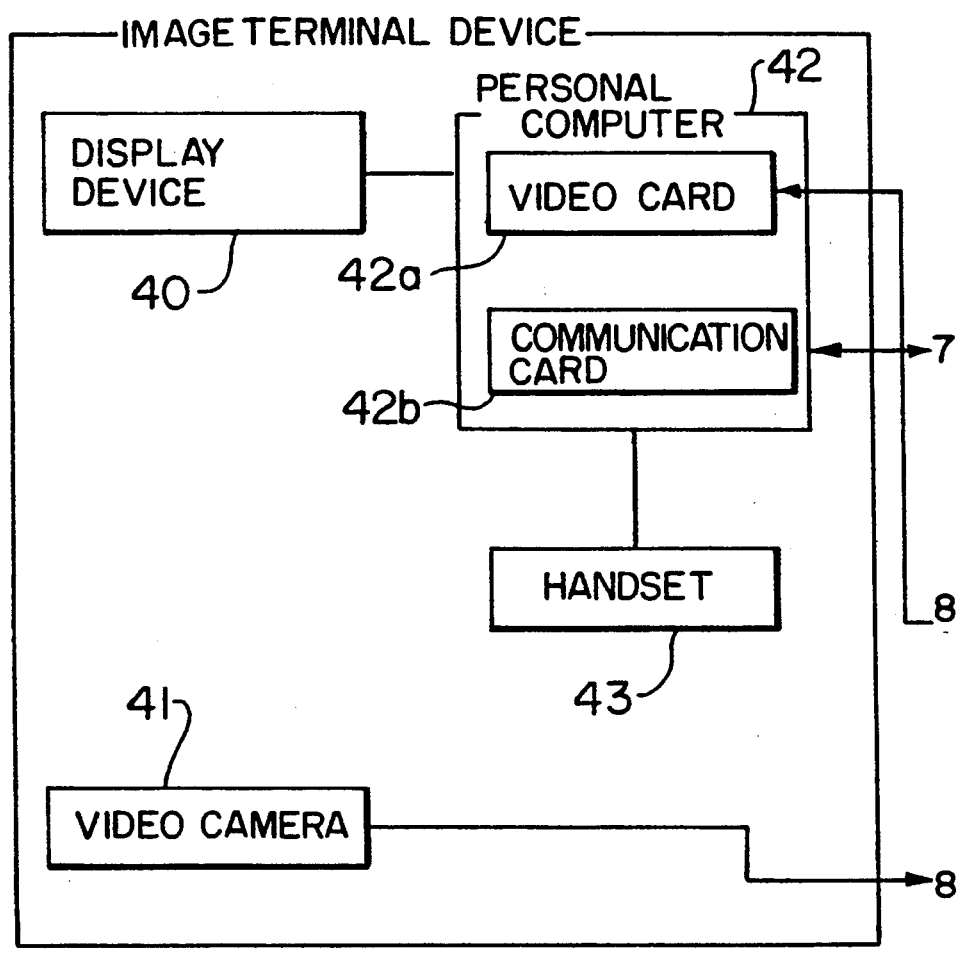
FIG. 3 is an internal structural block diagram of an image terminal device according to the first embodiment.

Next, an internal structure of an image terminal device 4 is described with reference to FIG. 3.

The image terminal device 4 comprises a display device 40, a video camera 41, a personal computer 42 and a handset 43.

The above mentioned display device 40 is a device for displaying image signal on a screen.

The video camera 41 is a device for picking up an image of a subscriber of the image terminal device 4 in question to enter image signal into the image terminal device.

The personal computer 42 comprises a video card 42a and a communication card 42b for transmitting and receiving the image signal to and from an image communication processing device 5.

The video card 42a is for use in superimposing the image signal supplied from the image communication processing device 5 on an image generated by the personal computer 42 to generate the image. This image is displayed on the screen by the display device 40.

The communication card 42b is for use in transmitting and receiving the signal to and from the image communication processing device 5. More particularly, transmitted and received are image signal, a call controlling signal, and destination information or the like.

The handset 43 is used to input and output an audio signal.

Figure 4:
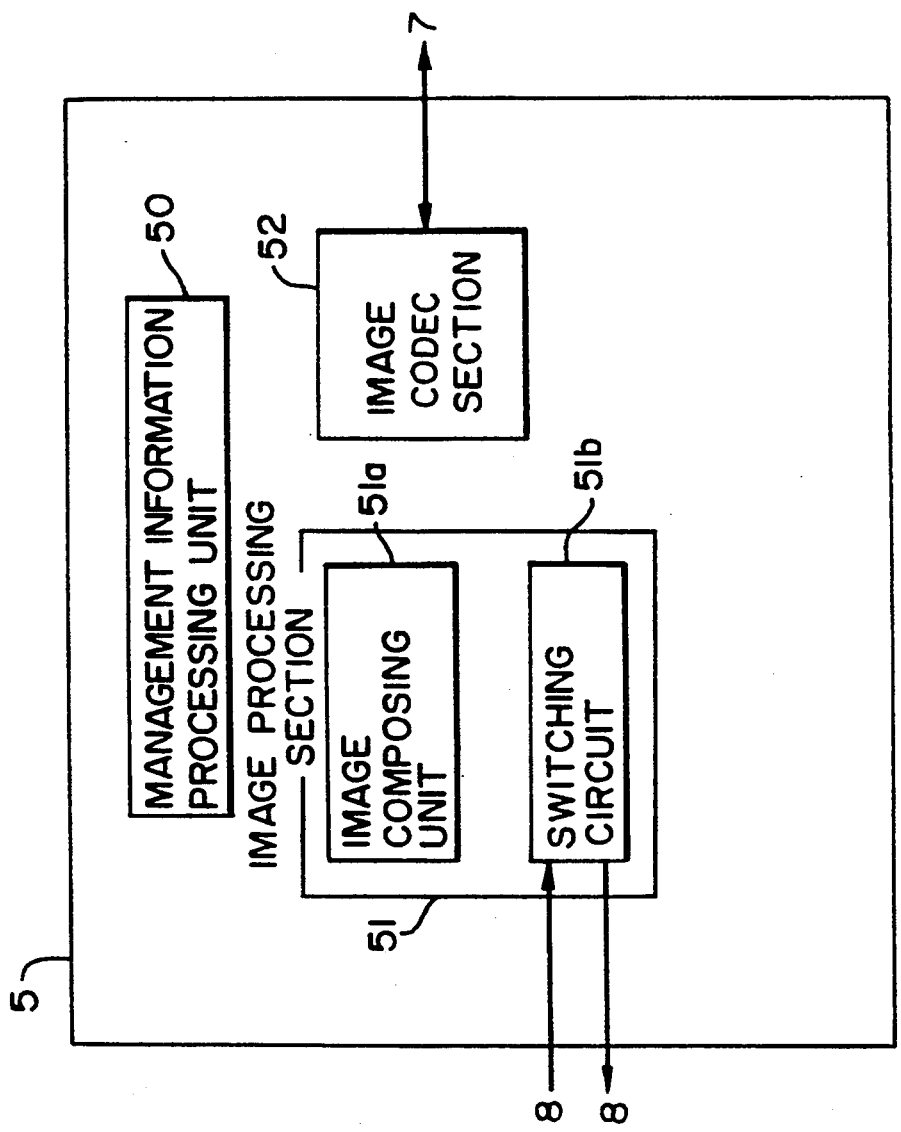
FIG. 4 is an internal structural block diagram of an image communication processing device according to the first embodiment.

FIG. 4 is a block diagram showing an internal structure of the image communication processing device 5.

The image communication processing device 5 according to the present embodiment 1 comprises an image processing section 51, an image codec section 52 and a management information processing unit 50.

The image cordic section 52 has a function to encode at a high efficiency the image signal transmitted from the image terminal device (A) 4a and the image terminal device (B) 4b in the private branch exchange network at the transmitting side (the image terminal device (C) 4c and the image terminal device (D) 4d in the private branch exchange network at the receiving side) to transmit the same to the PBX 6, and a function to decode the image signal transmitted from the PBX 6. A practical example thereof will be described later.

The image processing section 51 is for composing the image signal transmitted from the image terminal device (A) 4a and the image terminal device (B) 4b in the private branch exchange network at the transmitting side (the image terminal device (C) 4c and the image terminal device (D) 4d in the private branch exchange network at the receiving side) to generate a composite signal. The image processing section 51 comprises an image composing unit 51a and a switching circuit 51b.

The image composing unit 51 reduces each of the plural image signals and composes the reduced image signal to generate a composite signal. The resolution of the composite signal is equal to the resolution of the image signal transmitted from each image terminal device 4. In the first embodiment, each of the image terminal device (A) 4a, the image terminal device (B) 4b, the image terminal device (C) 4c and the image terminal device (D) (hereinafter referred generally to as the image terminal 4) produces an image signal having the resolution of 352×288 dots. The image composing unit 51a comprises a composite signal format obtained by dividing the resolution of the image signal into four equal image regions to reduce and write the image signal transmitted from each image terminal device 4 into the respective image regions of the composite signal format.

In this event, the resolution of the respective screen regions in the composite signal is equal to 176×144 dots. Accordingly, the image composing unit 51a reduces the resolution (352×288 dots) of the image signal of each image terminal device 4 into a one-quarter resolution (176×144 dots) to write the same into the respective screen regions of said composite signal format.

The switching circuit 51b comprises input/output terminals of three groups. Input/output terminals of the first group are connected to each image terminal device 4 through the second subscriber line 8, input/output terminals of the second group are connected to the image cordic section 52 through an analog line and input/output terminals of the third group are connected to the image composing unit 51a through an analog line.

The functions of the switching circuit 51b are as follows:
(1) a function to receive the image signal transmitted from each image terminal 4 through the input terminal of the first group and to supply it to the image composing unit 51b through the output terminal of the third group;
(2) a function to receive the composite signal transmitted from the image composing unit 51b through the input terminal of the third group and to supply it to the image codec section 52 through the second group of output terminal; and;
(3) a function to receive the composite signal transmitted from the image codec section 52 through the input terminal of the second group and to supply it to each image terminal 4 through the output terminals of the first group.

The switching circuit 51b is realized by, for example, an 8×8 matrix switch.

The management information processing unit 50 has a function to transmit and receive management information to and from the image communication processing device at the receiving side through the image codec section 52, and a function to control operation of the image processing section 51 in accordance with the management information. The term of the management information defined herein is destination information (information for use in identifying the directed image terminal) of the respective image signal composed as the composite signal. More particularly, the composite signal according to the first embodiment is divided into four equal screen regions and the reduced image signal is composed in the respective screen regions. The management information processing unit 50 in question transmits, on transmitting the composite signal, the destination information (information for use in identifying the image terminal device 4 at the receiving side) of the image signal composed with the respective screen regions to the image communication processing device 5 at the receiving side by using the D channel of the first subscriber line 7. On the other hand, the management information processing unit 50 in the image communication processing device 5b at the receiving side extracts the management information from the D channel of the first subscriber line 7 to enter the destination information of the image signal in the composite signal composed with the respective screen regions. Further, the management information processing unit 50 switches, in accordance with the destination information in question, an output path of the first group of the switching circuit 51b to supply the composite signal in question to the switching circuit 51b. The switching circuit 51b supplies the composite signal in question to all destinations. For example, if two image signals are composed as the composite signal, the switching circuit 51b connects two output terminals of the first group to two image terminal devices 4 at the receiving side. Then, the switching circuit 51b supplies the composite signal which is entered from the input terminal of the second group to said two output terminals of the first group. As a result of this, each image terminal device 4 at the receiving side receives the composite signal in question as a composition of these two image signal.

In addition, the above mentioned image information contains a call signal and a call disconnection signal.

Figure 5:
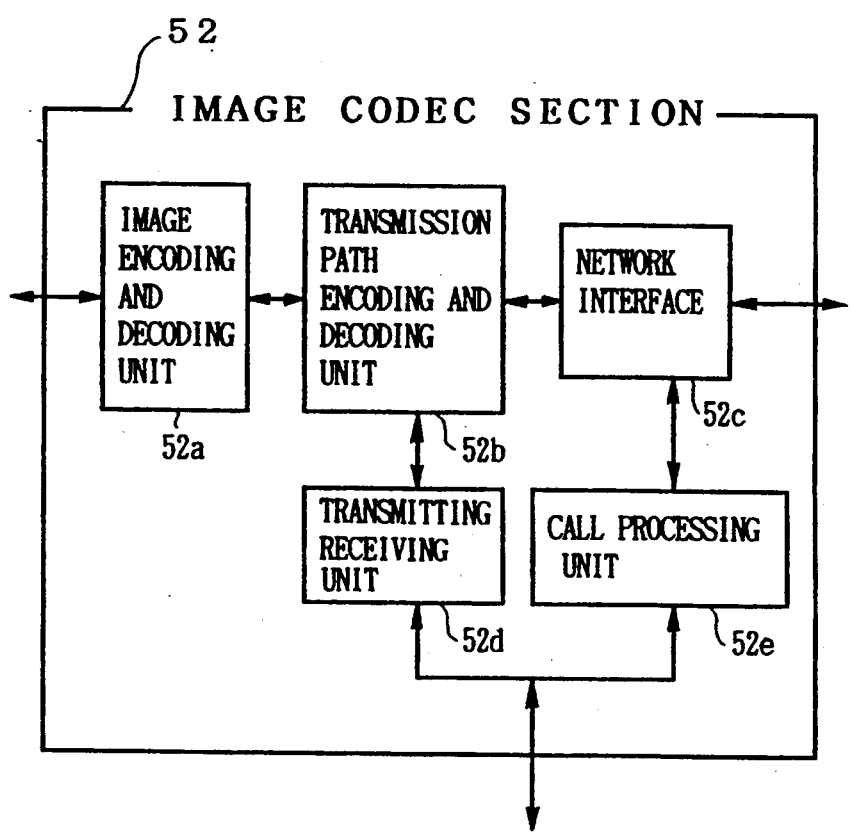
FIG. 5 is an internal structural block diagram of an image cordic section according to the first embodiment.

FIG. 5 shows an internal structural block diagram of the image codec section 52.

In this figure, the image codec section 52 according to the present embodiment 1 is composed of an image encoding and decoding unit 52a, a transmission path encoding and decoding unit 52b, a network interface 52c, a transmitting and receiving unit 52d and a call processing unit 52e.

The above mentioned image encoding and decoding unit 52a has a function to encode the composite signal generated by the image composing unit 51a, and a function to decode the composite signal supplied from the private branch exchange network at the receiving side.

The transmission path encoding and decoding unit 52b has a function to encode into a transmission path code the composite signal encoded by said image encoding and decoding unit 52a, and a function to decode the composite signal supplied from the private branch exchange network at the receiving side.

The network interface 52c is for interfacing to the PBX 6.

The transmitting and receiving unit 52d has a function to transmit the management information supplied from the above mentioned management information processing unit 50 to the image communication processing device 5 at the receiving side through the transmission path encoding and decoding unit 52b and the network interface 52c, and a function to send the management information supplied from the image communication processing device 5 at the receiving side to the management information processing unit 50.

The call processing unit 52e carries out signaling on connecting and disconnecting a call.

Figure 6:
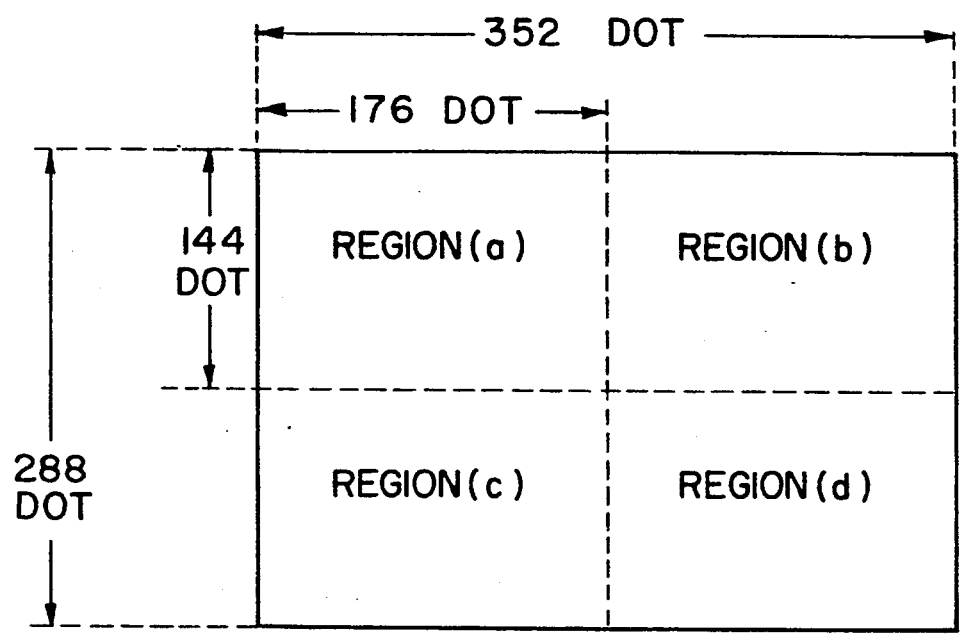
FIG. 6 is an example of a composite signal according to the first embodiment.

Now, FIG. 6 shows a format of the composite signal in the first embodiment while FIG. 7 shows an example of the composite signal generated by the image communication processing device 5.

In the present embodiment 1, the image signal supplied from each image terminal device 4 has a resolution of 352×288 dots and the image composing unit 51a reduces said image signal into one-quarter. As a result, the resolution of the reduced image signal becomes 176×144 dots.

In addition, a region identifier (a), a region identifier (b), a region identifier (c) and a region identifier (d) are assigned to the respective screen regions of the composite signal divided into four divisions.

Next, in FIG. 7, FIG. 7 (A) is an example of the composite signal to be transmitted from the private branch exchange network at the transmitting side while FIG. 7 (B) is an example of the composite signal to be transmitted from the private branch exchange network at the receiving side. In this event, it is assumed that the image terminal device (A) 4a is under communication with the image terminal device (C) 4c while the image terminal device (B) 4b is under communication with the image terminal device (D) 4d.

In FIG. 7 (A), the private branch exchange network at the transmitting side writes the image signal of the image terminal device (A) 4a into a region (a) and writes the image signal of the image terminal device (B) 4b into a region (b) to generate the composite signal. In this event, regions (c) and (d) are reserved as empty regions.

The management information processing unit 50 at the transmitting side transmits, as the management information, the destination information of the image signal in the region (a) (a receiving number of the image terminal device (C) 4c) and the destination information of the image signal in the region (b) (a receiving number of the image terminal device (D) 4d) to the private branch exchange network at the receiving side.

In the private branch exchange network at the receiving side, the image communication processing device 5b receives the management information in question and the composite signal through the image codec section 52.

The image codec section 52 supplies the management information to the management information processing unit 50 and simultaneously supplies the composite signal to the switching circuit 51b.

The management information processing unit 50 recognizes, in accordance with the management information in question, the image terminal device (C) 4c and the image terminal device (D) 4d or the destinations of the composite signal to switch the output path of the first group of the switching circuit 51b into the image terminal device (C) 4c and the image terminal device (D) 4d. The switching circuit 51b is allowed to transmit the composite signal to the image terminal device (C) 4c and the image terminal device (D) 4d.

In addition, the image communication processing device 5b notifies each image terminal device 4 of the region identifier of the image signal to be displayed. More particularly, the image communication processing device 5b notifies the image terminal device (C) 4c of the region identifier (a) and simultaneously notifies the image terminal device (D) 4d of the region identifier (b). The region identifiers are notified from the image communication processing device 5b to each image terminal device 4 through the PBX 6 via the first subscriber line 7.

Each region identifier transmitted from the image communication processing device 5b is received by the communication card 42b in each image terminal device 4. At the same time, the composite signal transmitted from the image communication processing device 5b through the second subscriber line (8) is received by the video card 42a in each image terminal device 4.

The video card 42a in the image terminal device (C) 4c recognizes the region identifier (a) to clip the region (a) of the composite signal. Then, the video card 42a displays the clipped region (a) on a window of the display device 40. As a result, the display device 40 in the image terminal device (C) 4c displays only the image signal of the image terminal device (A) 4a.

On the other hand, the video card 42a in the image terminal device (D) 4d recognizes the region identifier (b) to clip the region (b) of the composite signal. Then, the video card 42a displays the clipped region (b) on a window of the display device 40. As a result, the display device 40 in the image terminal device (D) 4d displays only the image signal of the image terminal device (B) 4b.

In FIG. 7 (B), in the private branch exchange network at the receiving side, the image signal of the image terminal device (C) 4c is written into the region (a) while the image signal of the image terminal device (B) 4b is written into the region (b) to generate the composite signal.

In the private branch exchange network at the transmitting side, the image communication processing device 5a carries out the processing similar to that carried out by the above mentioned image communication processing device 5b. The display device 40 of the image terminal device (A) 4a displays the image signal of the image terminal device (C) 4c while the image terminal device (B) 4b displays the image signal of the image terminal device (D) 4d.

Figure 7A:
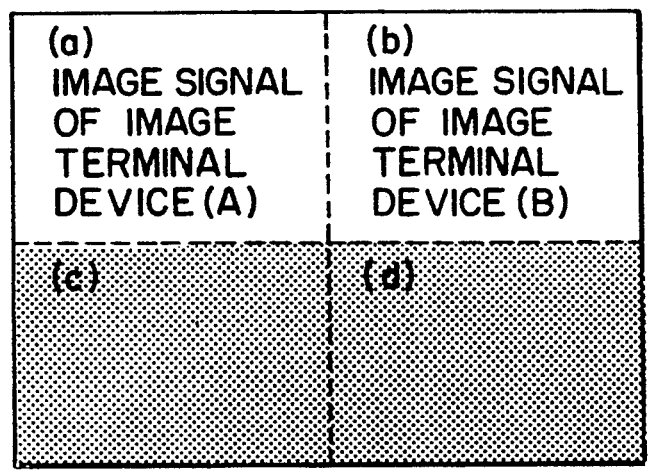
FIG. 7 (A) is a diagram showing a practical example of a composite signal transmitted from a private branch exchange at the transmitting side.
Figure 7B:
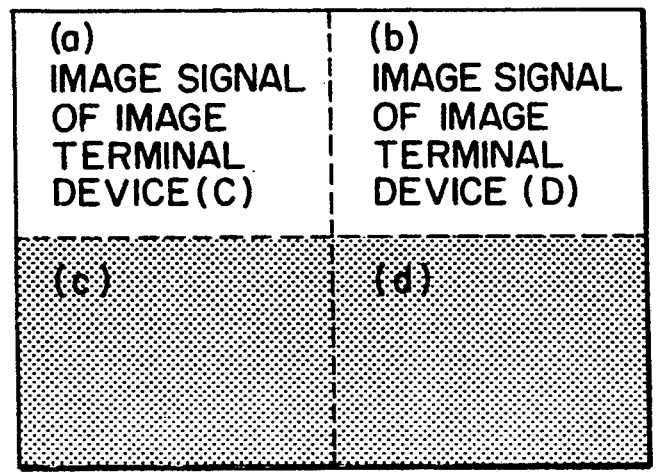

In FIGS. 7(A) and 7(B), while the image signal of the image terminal device (A) 4a (or the image terminal device (B) 4b) at the transmitting side and the image signal of the image terminal device (C) 4c (or the image terminal device (D) 4d) at the receiving side are composed with the same region (a), both image signal may be in the divergent regions.

Next, processing for assigning regions for the composite signal is described.

Figure 8:
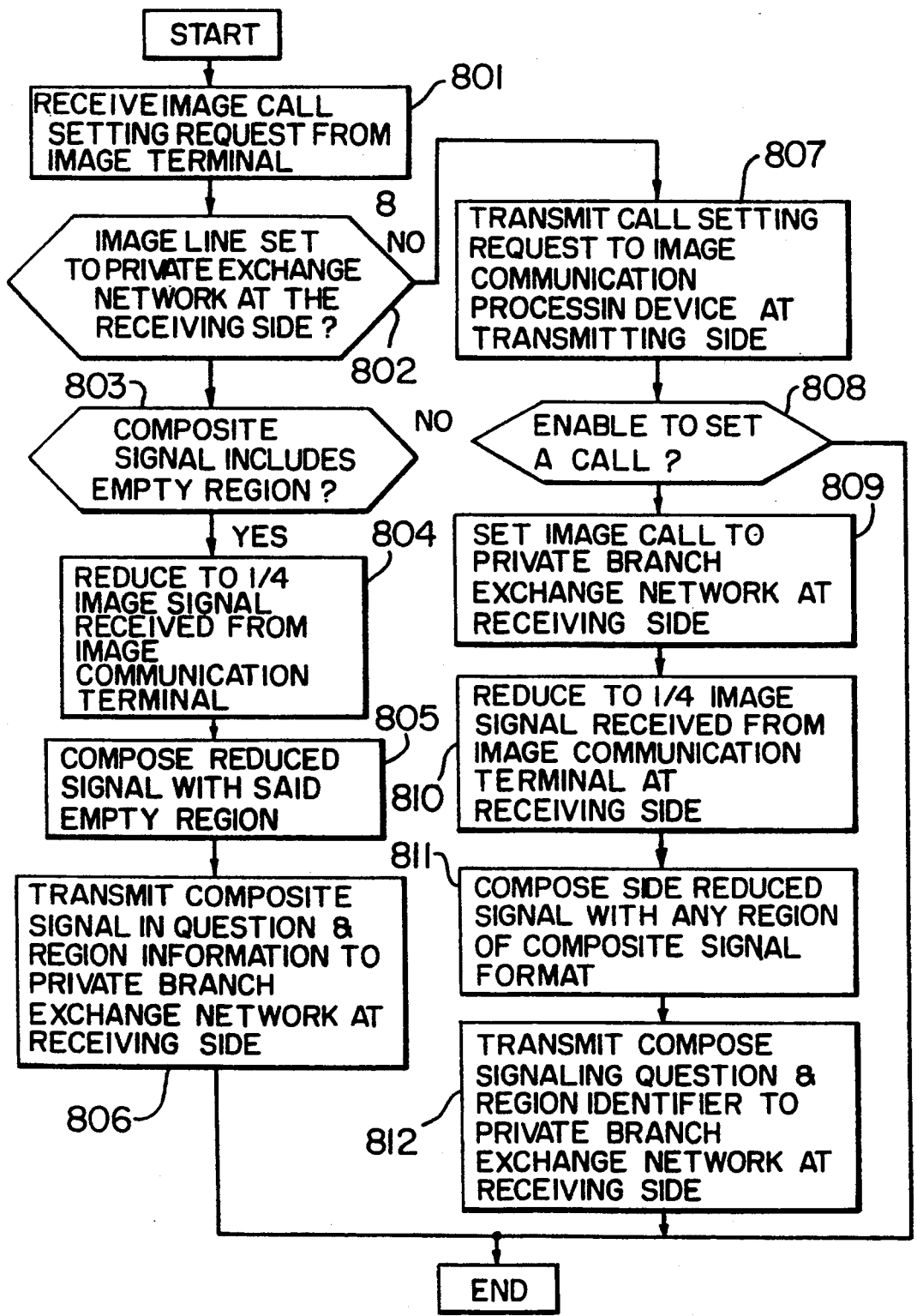
FIG. 8 is a flow chart showing an operational process of an image communication processing device at the transmitting side on reception of a call request.

FIG. 8 shows an operational process of the image communication processing device 5a at the transmitting side on receiving a call request.

In the image communication processing device 5a at the transmitting side, on reception of an image call setting request from the image terminal device (A) 4a (or the image terminal device (B) 4b) (Step 801), the management information processing unit 50 determines whether an image call is set between the private branch exchange network at the transmitting side and the private branch exchange network at the receiving side. More particularly, it determines whether the image terminal device other than the image terminal device (A) 4a (or the image terminal device (B) 4b) is under communication with the image terminal device in the private branch exchange network at said receiving side (Step 802).

If the image call is set to the private branch exchange network at said receiving side, the management information processing unit 50 determines whether the composite signal includes an empty region (Step 803). If the composite signal includes the empty region, the image processing section 51 receives the image signal from the image terminal device (A) 4a (or the image terminal device (B) 4b) to reduce this image signal into an image signal of one-quarter size (Step 804). Then, the image processing section 51 writes the reduced signal in question into the empty region of the composite signal format to generate the composite signal (Step 805). And the image processing section 51 transmits the generated composite signal to the private branch exchange network at the receiving side through the image codec section 52 (Step 806).

On the other hand, at the above mentioned Step 802, if the image call is not set to the private branch exchange network at the receiving side, the management information processing unit 50 transmits the image call setting request from the image codec section 52 to the private branch exchange network at the receiving side (Step 807). Then, on reception of a call setting enable signal from the private branch exchange network at the receiving side, the image communication processing device 5a set the image call to the private branch exchange network at the receiving side (Steps 808 and 809).

Next, in the image communication processing device 5a, the image processing section 51 receives the image signal from the image terminal device (A) 4a (or the image terminal device (B) 4b) to reduce this image signal into an image signal of one-quarter size (Step 810).

Further, the image processing section 51 writes the reduced image signal into a predetermined region of the composite signal format (Step 811) to generate the composite signal. And the image processing section 51 transmits the composite signal to the private branch exchange network at the receiving side through the image codec section 52 (Step 812).

It is noted, at the above mentioned Step 803, if the composite signal to be transmitted from the private branch exchange network at the receiving side has no empty region, the communication processing device 5a does not accept the image call setting request of the image terminal device (A) 4a (or the image terminal device (B) 4b).

The image communication processing device 5b at the receiving side carries out the processing similar to that shown at the Steps 803 through 806 in FIG. 8 for transmitting the composite signal to the image communication processing device 5a at the transmitting side.

An operational process of the image communication controlling apparatus according to the present embodiment 1 is described below.

Figure 9:
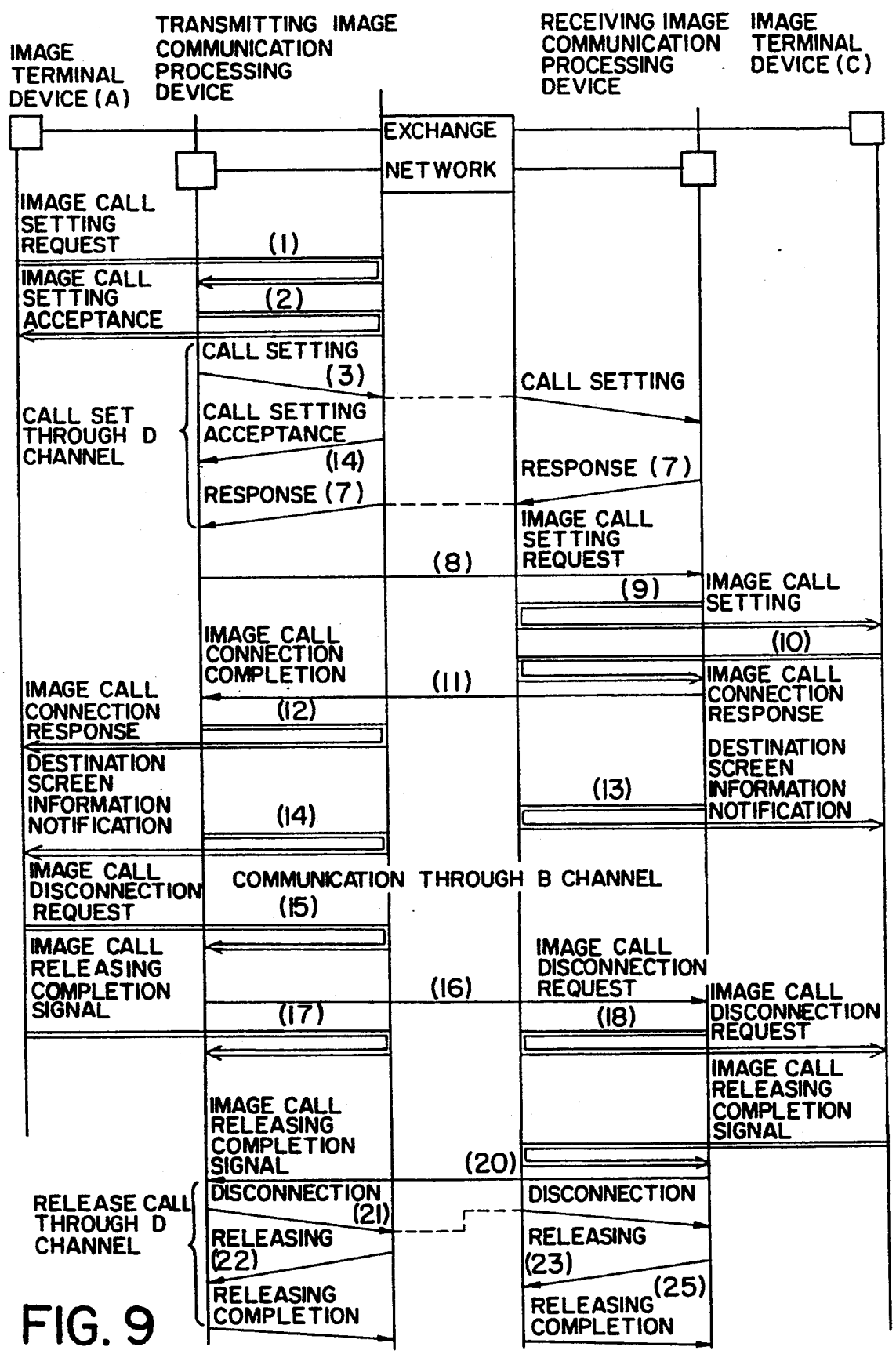
FIG. 9 is a sequential diagram showing an operational process of the image communication controlling apparatus according to the first embodiment.

FIG. 9 shows a sequential diagram showing an operational process of the image communication controlling apparatus according to the present embodiment 1, in which illustration is for a case where the image communication is made between the image terminal device (A) 4a and the image terminal device (C) 4c.

In the private branch exchange network at the transmitting side, the image terminal device (A) 4a at the transmitting side transmits an image call setting request to the image communication processing device 5a (Step (1)). This image call setting request signal is packet-transmitted through the D channel of the first subscriber line 7 and is supplied to the image communication processing device 5a through the PBX 6a.

In the image communication processing device 5a, the image codec section 52 receives the image call setting request signal and supplies this image call setting request signal to the management information processing unit 50.

The management information processing unit 50 returns an image call setting request acceptance signal to the image terminal device (A) 4a (Step (2)) and simultaneously transmits a call setting request signal to the PBX 6a.

The PBX 6a returns a call setting acceptance signal to the image communication processing device 5a at the transmitting side (Step (4)) and simultaneously transmits the call setting request signal to the PBX 6b at the receiving side.

The PBX 6b at the receiving side transmits said call setting request signal to the image communication processing device 5b (Step (7)). The PBX 6b transmits a call setting response signal to the PBX 6a at the transmitting side.

The PBX 6a at the transmitting side transmits a response signal indicative of completion of call setting to the image communication processing device 5a. At this stage, a call is established between the image communication processing device 5a and the image communication processing device 5b.

The image communication processing device 5a transmits the image call setting request signal to the image communication processing device 5b by using said call (Step (8)). In this event, it transmits the region identifier of the composite signal assigned to the image terminal device (A) 4a as well as the image call setting request signal.

The image communication processing device 5b determines whether the image terminal device (C) 4c at the receiving side is under the communication state or under the non-communication state. If the image terminal device (C) 4c in question is under the non-communication state, it supplies the image call setting request signal from the image communication processing device 5b to the image terminal device (C) 4c through the PBX 6b (Step (9)). On reception of an image call connection response signal from the image terminal device (C) 4c (Step (10)), the image communication processing device 5b transmits an image call connection completion signal to the image communication processing device 5a at the transmitting side (Step (11)). The image communication processing device 5b transmits the region identifier of the composite signal assigned to the image terminal device (C) 4c as well as said image call connection completion signal.

The image communication processing device 5a transmits the image call connection response signal to the image terminal device (A) 4a through the PBX 6a (Step (12)).

In this event, in the image communication processing device 5a, the image cordic section 52 transfers the image signal supplied from the image terminal device (A) 4a to the image processing section 51. The image processing section 51 supplies the image signal transmitted from the image terminal device (A) 4a to the image composing unit 51a through the image switching circuit 51b.

The image composing unit 51b reduces said image signal into an image signal of one-quarter size and writes it into a predetermined region of the composite signal format to generate a composite signal. The image composing unit 51b supplies said composite signal to the image codec section 52 through the image switching circuit 51b.

The image codec section 52, the image cordic section 52 encodes said composite signal into the transmission path code and transmits it to the private branch exchange network at the receiving side through the PBX 6a.

In the private branch exchange network at the receiving side, the image communication processing device 5b receives said composite signal through the PBX 6b. Then, it transmits this composite signal and the region identifier to the image terminal device (C) 4c (Step (13)).

On the other hand, the image communication processing device 5a at the transmitting side transmits to the image terminal device (A) 4a the composite signal supplied from the receiving side and the region identifier of the image terminal device (C) 4c (Step (14)).

After completion of the communication between the image terminal device (A) 4a and the image terminal device (B) 4b, the image terminal device (A) 4a transmits an image call disconnection request signal to the image communication processing device 5a through the PBX 6a (Step (15)).

In the image communication processing device 5a, the image codec section 52 receives the image call disconnection request signal. Then, the image codec section 52 supplies the image call disconnection request signal to the management information processing unit 50.

The management information processing unit 50 transmits the image call disconnection request signal to the image communication processing device 5b at the receiving side through the image codec section 52 (Step (16)).

In this event, the image communication processing device 5a at the transmitting side transmits an image call releasing completion signal to the image terminal device (A) 4a (Step (17)). Simultaneously with the Step (17), the image communication processing device 5b at the receiving side transmits the image call disconnection request signal to the image terminal device (C) 4c through the PBX 6b (Step (18)).

The image terminal device (C) 4c transmits the image call releasing completion signal to the image communication processing device b through the PBX 6b (Step (19)). The image communication processing device 5b transmits the image call releasing completion signal to the image communication processing device 5a at the transmitting side (Step (20)).

Further, the image communication processing device 5a disconnects the call set to the image communication processing device 5b at the receiving side. More particularly, the image communication processing device 5a in question transmits a call disconnection request signal to the PBX 6a (Step (21)). The PBX 6a transmits the call disconnection request signal to the PBX 6b at the receiving side. Then, the PBX 6b at the receiving side transmits the call disconnection request signal to the image communication processing device 5b.

In this event, in the private branch exchange network at the transmitting side, the PBX 6a returns a call releasing signal to the image communication processing device 5a (Step (22)). On the other hand, in the private branch exchange network at the receiving side, the image communication processing device 5b returns the call releasing signal to the PBX 6b (Step (23)).

Further, the image communication processing device 5a at the transmitting side transmits a call releasing completion signal to the PBX 6a (Step (24)), the PBX 6a transmits the call releasing completion signal to the image communication processing device 5b at the receiving side (Step (25)).

At the above mentioned Step (3), if it is under the call set state, i.e., if the image terminal device at the transmitting side other than the image terminal device (A) 4a is under the communication state with the private branch exchange network at the receiving side, the image communication controlling apparatus does not carry out the processing at Step (3) through Step (7).

In addition, at the above mentioned Step (21), if the image terminal device other than the image terminal device (A) 4a is under the communication state with the private branch exchange network at the receiving side, the image communication controlling apparatus does not carry out the processing at Step (21) through Step (25).

The processing at the above mentioned Step (3) through Step (7) and the processing at the Step (21) through Step (25) are carried out by using the D channel of the ISDN line while the signal transmitted and received between the image communication processing device 5a at the transmitting side and the image communication processing device 5b at the receiving side at the Step (8) through Step (20) is carried out by using the B channel of the ISDN line. Further, information transmitted and received between the image terminal device (A) 4a and the image communication processing device 5a at the transmitting side and information transmitted and received between the image terminal device (C) 4c and the image communication processing device 5b at the receiving side are carried out through the packet-communication using the D channel of the first subscriber line.

While the image call setting request signal is supplied from the image terminal device (A) 4a in this figure, an image call request signal is supplied from the private branch exchange network at the receiving side to the private branch exchange network at the transmitting side if the image call setting request signal is supplied from the image terminal device (C) 4c.

Further, if the image call disconnection request signal is supplied from the image terminal device (C) 4c, the image call disconnection request signal is supplied from the private branch exchange network at the receiving side to the private branch exchange network at the transmitting side.

In addition, in the present embodiment 1, call setting relating to an audio signal, call disconnection, and transmission and reception of the audio signal are carried out by the PBX 6a and PBX 6b.

As mentioned above, according to the present embodiment 1, it is possible to share a single image cordic section 52 with a plurality of image terminal devices 4. In addition, it is possible to transmit a plurality of image signal through a single high-speed line.

Figure 10:
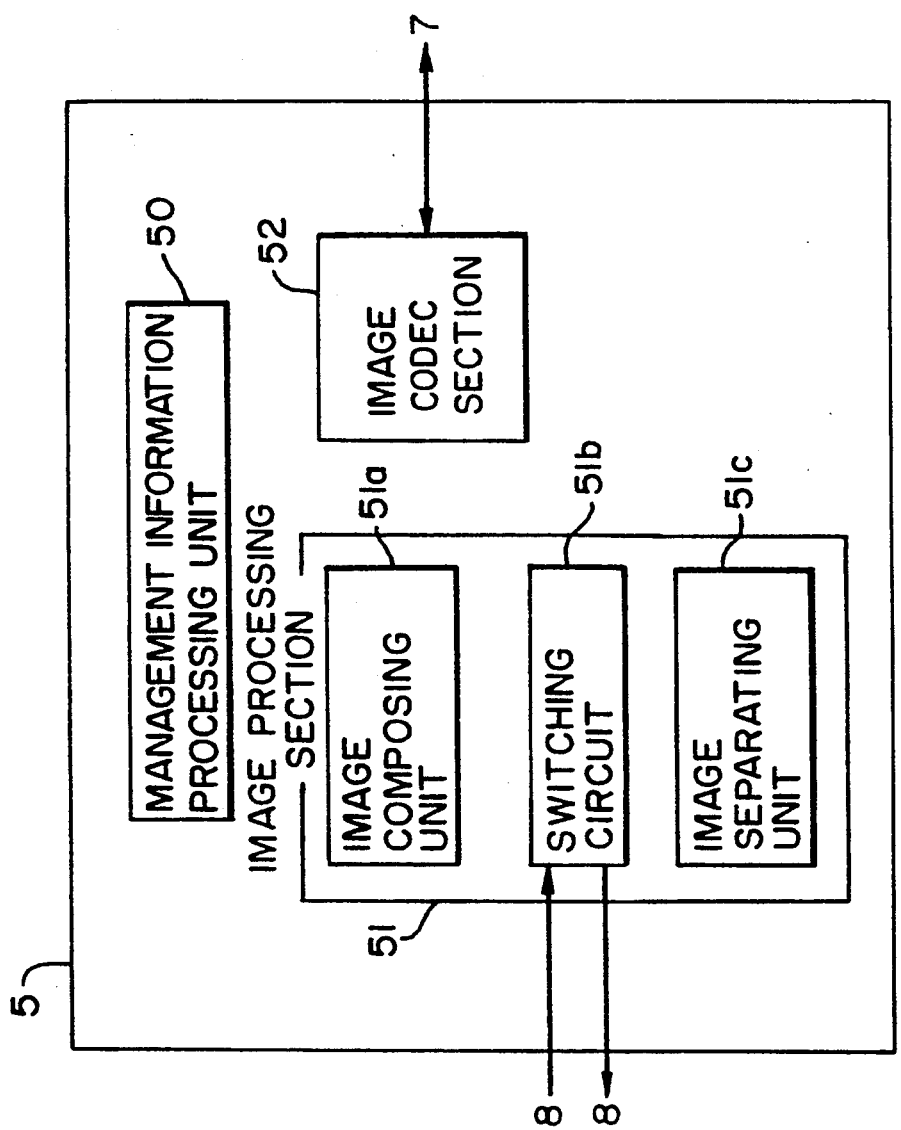
FIG. 10 is an internal structural block diagram of an image communication processing device according to a second embodiment.

FIG. 10 shows an internal structural block diagram of the image communication processing device 5 according to the second embodiment.

The image communication processing device 5 in the second embodiment comprises, along with the structure of the above mentioned embodiment 1, an image dividing unit 51c in the image processing section 51.

The image dividing unit 51c has a function to divide the image signal directed to each image terminal device 4 from the composite signal. A practical description is made below.

Figure 11:
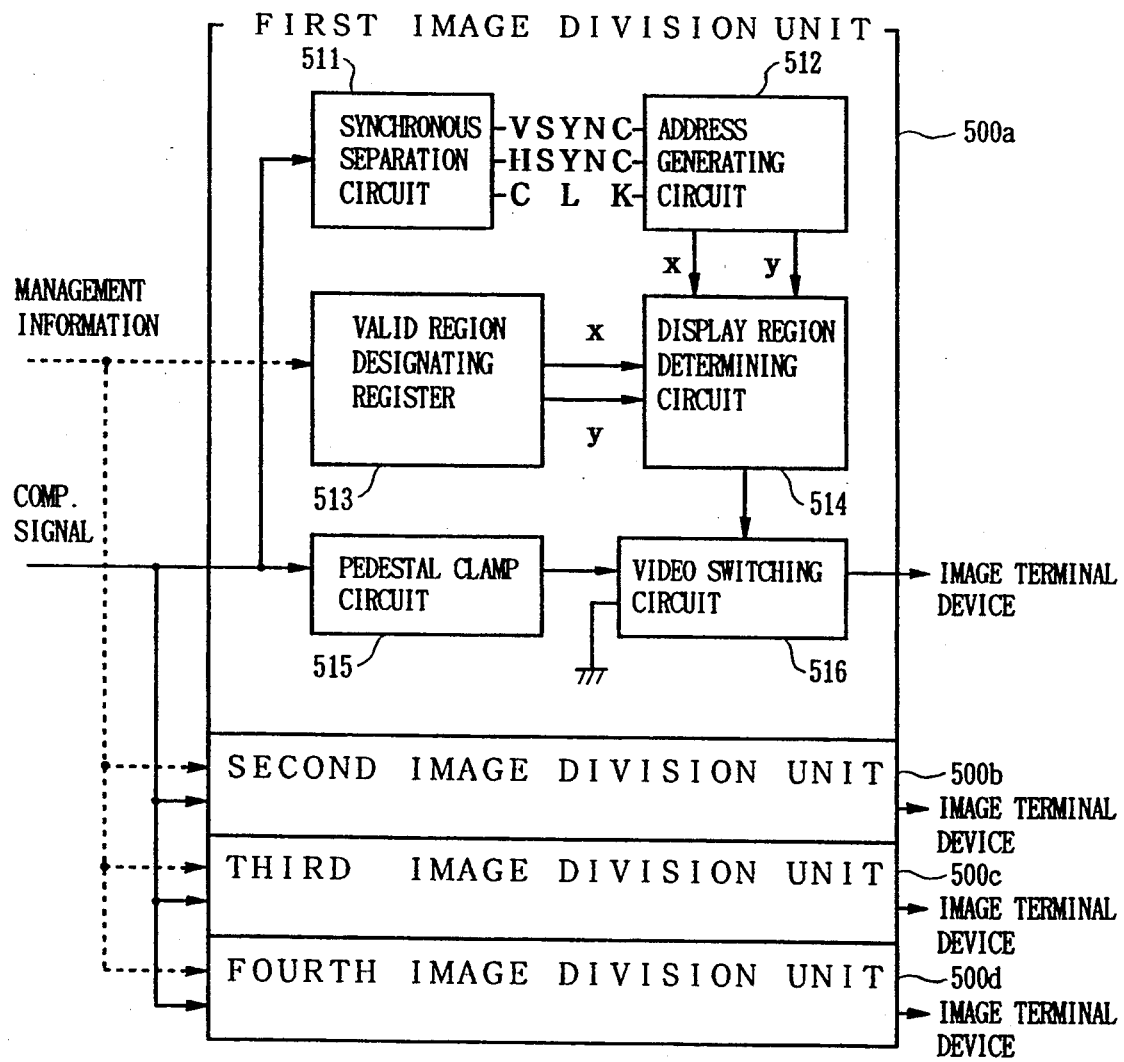
FIG. 11 is an internal structural block diagram of an image dividing unit according to the second embodiment.

FIG. 11 shows an internal structural block diagram of the image dividing unit 51c according to the present embodiment 2.

The image dividing unit 51c consists of four image division units: a first image division unit 500a, a second image division unit 500b, a third image division unit 500c and a fourth image division unit 500d.

The image division unit 500 has a function to divide from the composite signal the image signal to be transmitted to each image terminal device 4 and comprises a synchronous separation circuit 511, an address generating circuit 512, a valid region designating register 513, a display region determining circuit 514, a pedestal clamp circuit 515 and a video switching circuit 516.

The synchronous separation circuit 511 divides from the composite signal a vertical synchronous signal (VSYNC), a horizontal synchronous signal (HSYNC) and a clock signal (CLK).

The address generating circuit 512 determines the address of each dot of the composite signal in accordance with said vertical synchronous signal, the horizontal synchronous signal and the clock signal.

The valid region designating register 513 produces a valid region identifier for every one image signal to be transmitted to the image terminal device 4. The more specific description thereof will be made later.

The display region determining circuit 514 is a circuit for determining whether the address of each dot of the composite signal is included in said valid region.

The pedestal clamp circuit 515 is a circuit for fixing a black level of the supplied image signal to a ground level.

The video switching circuit 516 comprises two input terminals and one switch controlling terminal. One of the input terminals is connected to the pedestal clamp circuit 515 and the other input terminal is connected to the ground. In addition, the switch controlling terminal is connected to the output of the display region determining circuit 514.

Figure 12:
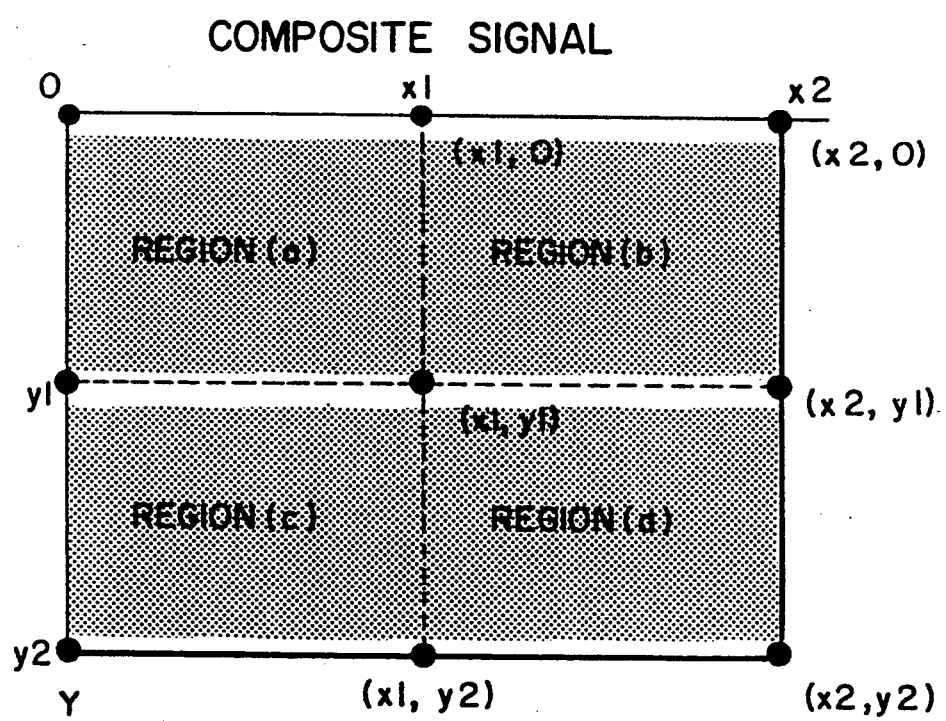
FIG. 12 is a practical example of a composite signal assigned with addresses.
Figure 13:
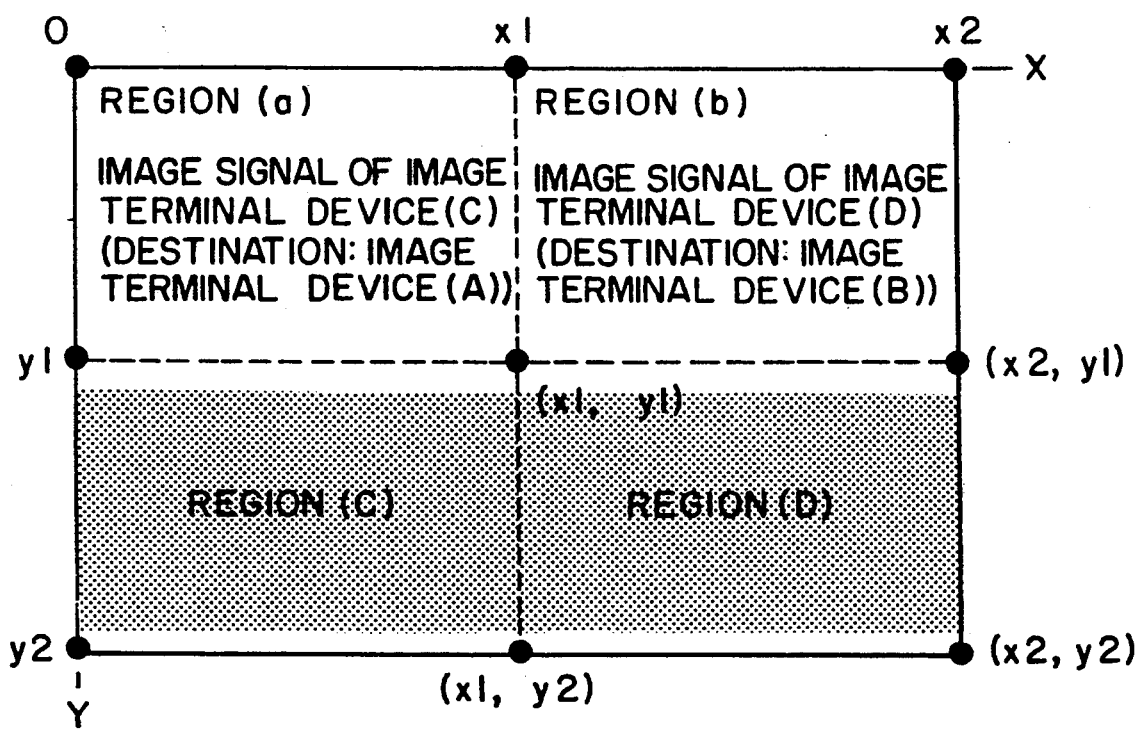
FIG. 13 is a practical example of a composite signal transmitted from a private branch exchange network at the receiving side.

In the second embodiment, the composite signal is addressed on two-dimensional coordinates having a horizontal direction "X" and a vertical direction "Y". A practical example thereof is shown in FIG. 12. The resolution of the image signal supplied from each image terminal device 4 is assumed to be 352×288 dots and the composite signal format is assumed to be divided into four equal regions, i.e., the region (a), the region (b), the region (c) and the region (d).

Each region of the composite signal format is composed with the image signal of the image terminal device 4. In FIG. 12, the region of the composite signal is represented by $\{X|0\leq X\leq x2, Y|0\leq Y\leq y2\}$ (x2=352, y2=288). According to this, the valid region of the region (a) is $\{X|0\leq X\leq x1, Y|0\leq Y\leq y1\}$ (x1=176, y1=144). The valid region of the region (b) is $\{X|x1\leq X\leq x2, Y|0\leq Y\leq y1\}$. The valid region of the region (c) is $\{X|0\leq X\leq x1, Y|y1\leq Y\leq y2\}$. The valid region of the region (d) is $\{X|x1\leq X\leq x2, Y|y1\leq Y\leq y2\}$.

Next, described is an image dividing processing carried out in the private branch exchange network at the transmitting side.

In this event, it is assumed that the image terminal device (A) 4a is at the communication state with the image terminal device (C) 4c while the image terminal device (B) 4b is at the communication state with the image terminal device (D) 4d, and the region of the image terminal device (C) 4c in the composite signal is the region (a) while the region of the image terminal device (D) 4d is the region (b).

In the private branch exchange network at the transmitting side, the image communication processing device 5a receives a composite signal consisting of the image signal of the image terminal device (C) 4c and the image signal of the image terminal device (D) 4d. In this event, the image codec section 52 transmits the management information as well as the composite signal to the management information processing unit 50.

The management information processing unit 50 recognizes the region identifiers (a) and (b) assigned to the image signal of the image terminal device (C) 4c and the image signal of the image terminal device (D) 4d, respectively.

The management information processing unit 50 registers the region identifier (a) in the first image division unit 500a and registers the region identifier (b) in the second image division unit 500b.

In each image division unit 500, the region identifier is registered in the valid region designating register 513.

Further, the management information processing unit 50 supplies the composite signal to the first image division unit 500a and the second image division unit 500b. A processing process of the first image division unit 500a is described below.

In the first image division unit 500a, $\{X|0\leq X\leq x1, Y|0\leq Y\leq y1\}$ (x1=176, y1=144) is registered as the valid region of the region (a) in the valid region designating register 513. The valid region designating register 513 supplies this valid region designation information to the display region determining circuit 514.

The synchronous separation circuit 511 divides from the composite signal the vertical synchronous signal, the horizontal synchronous signal and the clock signal to supply these signals to the address generating circuit 512.

The address generating circuit 512 supplies to the display region determining circuit 514 an address (X, Y) of each dot of the composite signal on the two-dimensional coordinates in accordance with the vertical synchronous signal, the horizontal synchronous signal and the clock signal.

Figure 14:
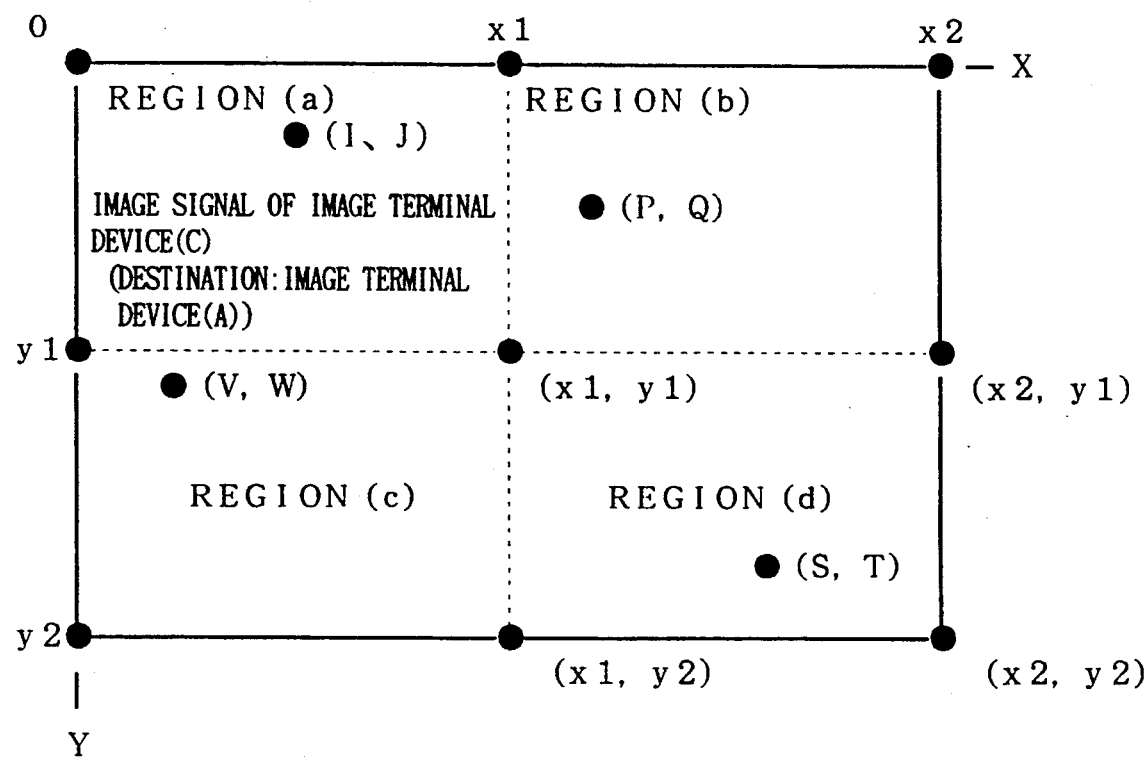
FIG. 14 is a diagram showing a process for dividing images.

The display region determining circuit 514 compares an address signal (X, Y) of each dot supplied from the address generating circuit 512 with said valid region designating information to determine if $0\leq X\leq x1$ and $0\leq Y\leq y1$ are satisfied. A practical image thereof is shown in FIG. 14. The display region determining circuit 514 compares, on receiving address information (P, Q) from the address generating circuit 512, this (P, Q) with the valid region designating information $\{X|0\leq X\leq x1, Y|0\leq Y\leq y1\}$. The display region determining circuit 514 determines that the dot of the address (P, Q) is out of the valid region because P>x1 in FIG. 14. In such a case, the display region determining circuit 514 activates the video switching circuit 516 to switch it to the input terminal at the ground side. As a result of this, the video switching circuit 516 is supplied with a value of the black level as an RGB value of the dot (P, Q).

Next, the display region determining circuit 514 compares, on receiving address information (S, T) from the address generating circuit 512, this (S, T) with the valid region designating information $\{X|0\leq X\leq x1, Y|0\leq Y\leq y1\}$. The display region determining circuit 514 activates the video switching circuit 516 to switch to the input terminal at the ground side because S>x1 and T>y1 in FIG. 14. As a result of this, the video switching circuit 516 is supplied with a value of the black level as an RGB value of the dot (S, T).

Further, the display region determining circuit 514 compares, on receiving address information (V, W) from the address generating circuit 512, this (V, W) with the valid region designating information $\{X|0\leq X\leq x1, Y|0\leq Y\leq y1\}$. The display region determining circuit 514 activates the video switching circuit 516 to switch to the input terminal at the ground side because W>y1 in FIG. 14. As a result of this, the video switching circuit 516 is supplied with a value of the black level as an RGB value of the dot (V, W).

In addition, the display region determining circuit 514 compares, on receiving address information (I, J) from the address generating circuit 512, the information (I, J) with the valid region designating information $\{X|0\leq X\leq x1, Y|0\leq Y\leq y1\}$. The display region determining circuit 514 activates the video switching circuit 516 to switch to the input terminal at the pedestal clamp circuit side because $0\leq I\leq x1$ and $0\leq J\leq y1$ in FIG. 14. As a result of this, the video switching circuit 516 produces a value of the image signal supplied as an RGB value of the dot (I, J) as it is.

Figure 15:
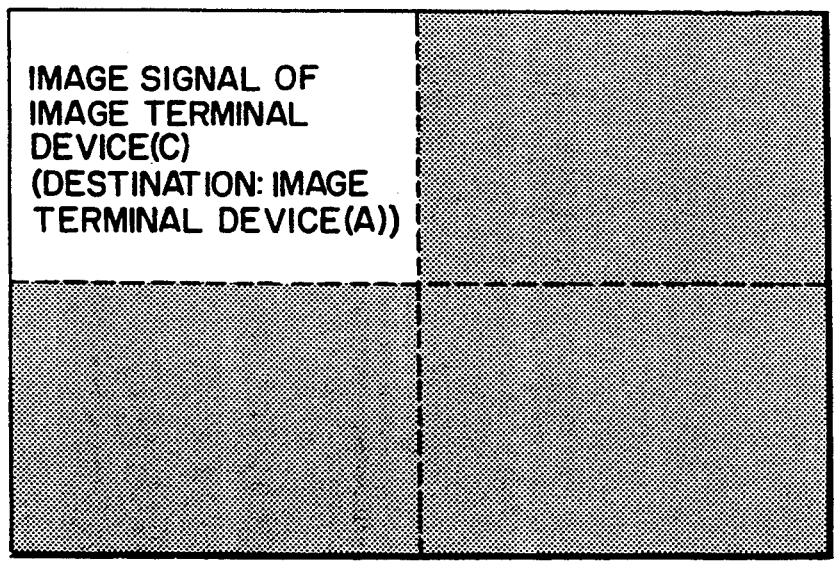
FIG. 15 is a diagram showing a composite signal after division of images.

By means of carrying out the above mentioned processing repeatedly, the first image division unit 500a enables to converting the regions other than the region (a) into the black level (see FIG. 15). Further, this image signal is transmitted to the image terminal device (A) 4a through the switching circuit 51b.

The second image division unit 500b enables to transmitting only the image signal of the region (b) to the image terminal device (B) by means of carrying out the processing similar to that carried out by the above mentioned first image division unit 500a.

In addition, it is similar in structure to the above mentioned embodiment 1 other than said image dividing unit 51c, and description thereof will be omitted.

[Embodiment 3]

Figure 16:
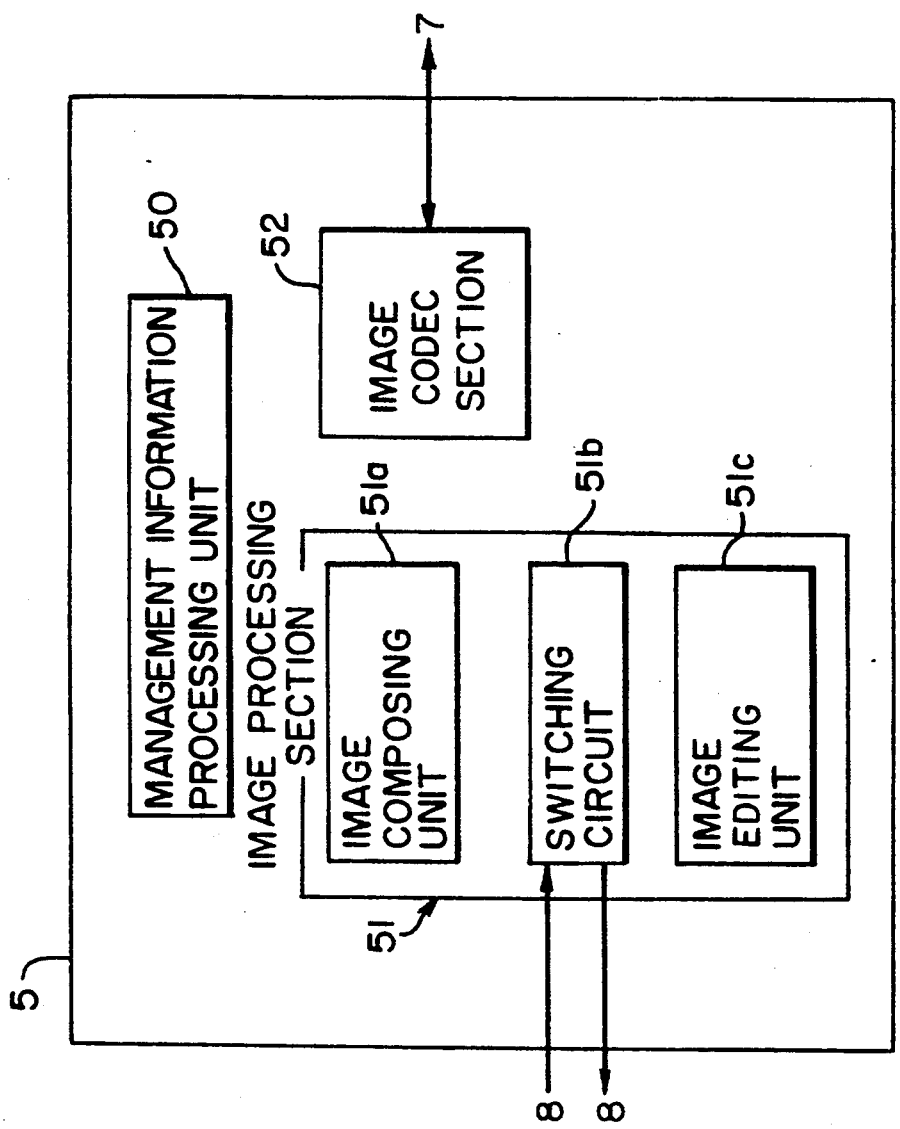
FIG. 16 is an internal structural block diagram of an image communication processing device according to a third embodiment.

FIG. 16 shows an internal structural block diagram of the image communication processing device 5 according to the third embodiment.

The image communication processing device 5 in the present embodiment 3 comprises, along with the structure of the above mentioned embodiment 1, an image editing unit 51d. Other components are similar to the above mentioned first embodiment and description thereof will be omitted. In the third embodiment, the composite signal is assumed to be divided into four regions.

The image editing unit 51d has a function to divide, on receiving the composite signal from the private branch exchange network at the transmitting side, the image signal of the image terminal device 4 at the transmitting side from this composite signal and simultaneously reduce the image signal of the image terminal device 4 at the receiving side into one-quarter, and a function to compose the image signal of the image terminal device 4 at the transmitting side with the image signal of the image terminal device 4 at the receiving side. The detailed description thereof is made below.

Figure 17:
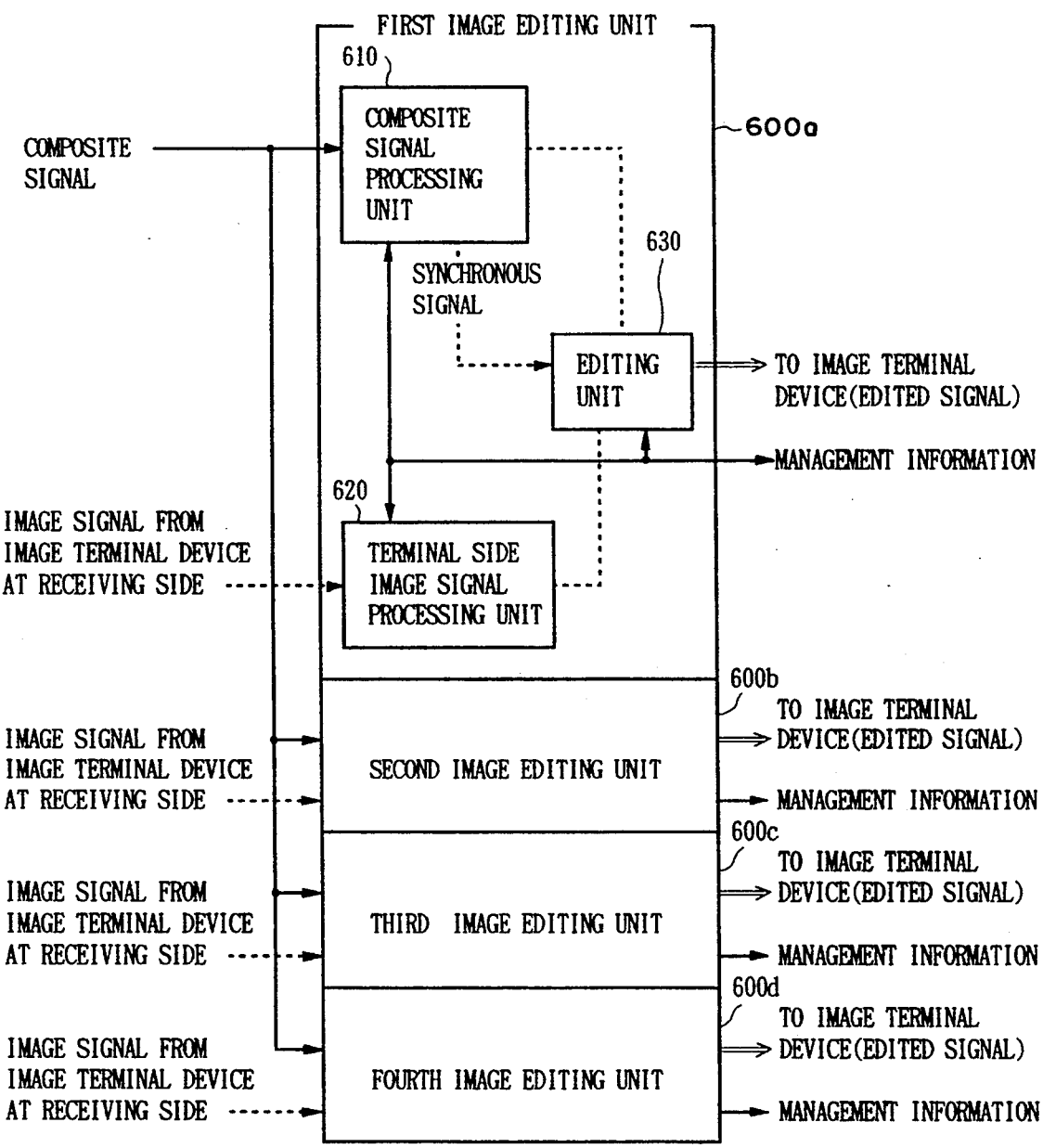
FIG. 17 is an internal structural block diagram of an image editing unit according to the third embodiment.

FIG. 17 is an internal structural block diagram of the image editing unit 51d according to the third embodiment.

The image editing unit 51d in the present embodiment 3 is composed of a first image edition unit 600a, a second image edition unit 600b, a third image edition unit 600c and the fourth image edition unit 600d.

Each image edition unit 600 comprises a composite signal processing unit 610, a terminal side image signal processing unit 620 and an edition unit 630.

The composite signal processing unit 610 is for use in dividing from the composite signal the image signal to be transmitted to the image terminal device 4 at the receiving side.

The terminal side image signal processing unit 620 has a function to reduce the image signal picked up in the image terminal device 4 at the receiving side into an image signal of one-quarter.

The edition unit 630 has a function to compose the image signal supplied from the composite signal processing unit 610 with the image signal supplied from the terminal side image signal processing unit 620.

Figure 18:
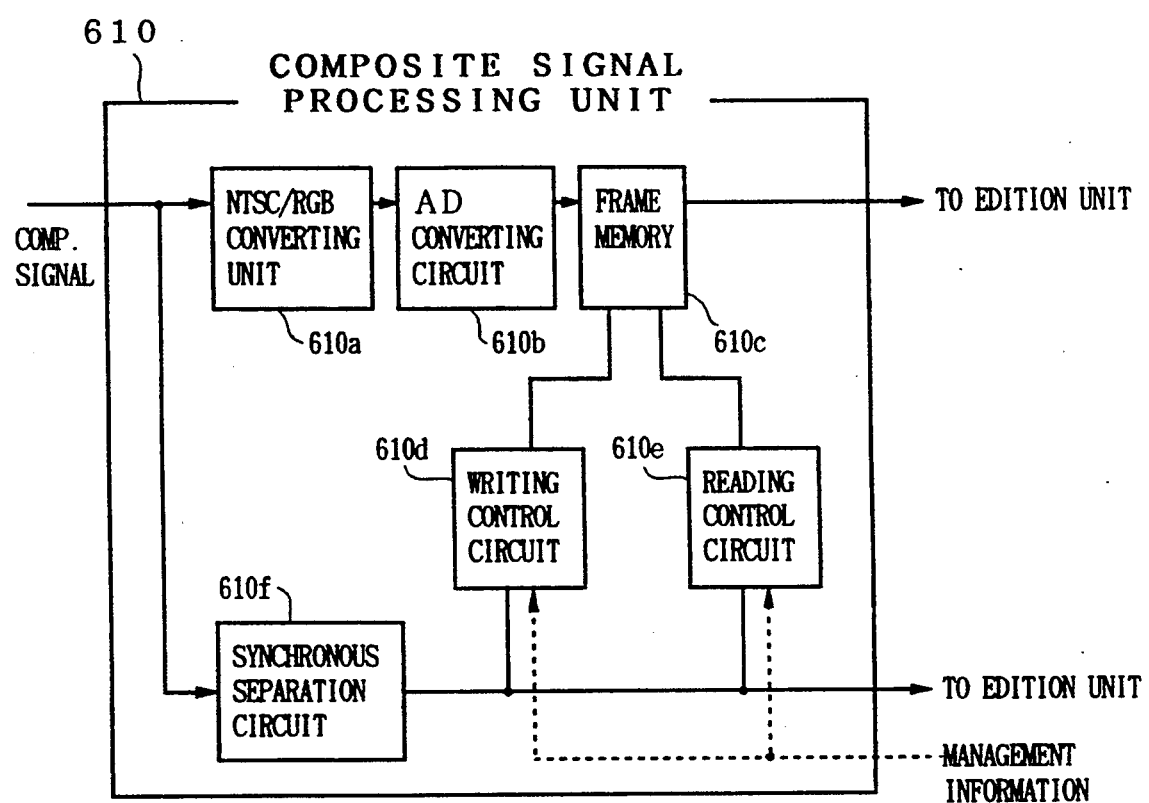
FIG. 18 is an internal structural block diagram of a composite signal processing unit according to the third embodiment.

FIG. 18 shows an internal structural block diagram of the composite signal processing unit 610.

The composite signal processing unit 610 comprises an NTSC/RGB converting circuit 610a, an A/D converting circuit 610b, a frame memory 610c, a synchronous separation circuit 610f, a writing control circuit 610d and a reading control circuit 610e. In this event, the writing control circuit 610d and the reading control circuit 610e are connected to the management information processing unit 50 through a system bus.

The NTSC/RGB converting circuit 610a converts the composite signal supplied from the private branch exchange network at the receiving side from an NTSC analog signal to an analog RGB signal.

The A/D converting circuit 610b has a function to convert the analog RGB signal to a digital RGB signal.

The reading control circuit 610e has a function to read the image signal written in the frame memory 610c and, in the third embodiment, has a function to divide from the composite signal the image to be supplied to the image terminal device 4 at the receiving side.

The synchronous separation circuit 610f has a function to divide the vertical synchronous signal, the horizontal synchronous signal and a sampling clock signal from the composite signal supplied to the composite signal processing unit 610 in question. Further, the synchronous separation circuit 610f supplies the vertical synchronous signal, the horizontal synchronous signal and the sampling clock signal to the writing control circuit 610d and the reading control circuit 610e and simultaneously to the edition unit 630.

The writing control circuit 610d has a function to determine an address of each dot of the composite signal and a function to determine an address of each dot in the frame memory 610c in accordance with that address and the management information. More particularly, on receiving said vertical synchronous signal, the horizontal synchronous signal and the sampling clock signal from the synchronous separation circuit 610f, the writing control circuit 610d produces an (x, Y) address signal of each image signal in the composite signal in accordance with these signals. Further, the writing control circuit 610d receives an offset address value from the management information processing unit 50 to add said (X, Y) address and the offset address value, thereby determining the address of each dot in the frame memory 610c.

Figure 19:
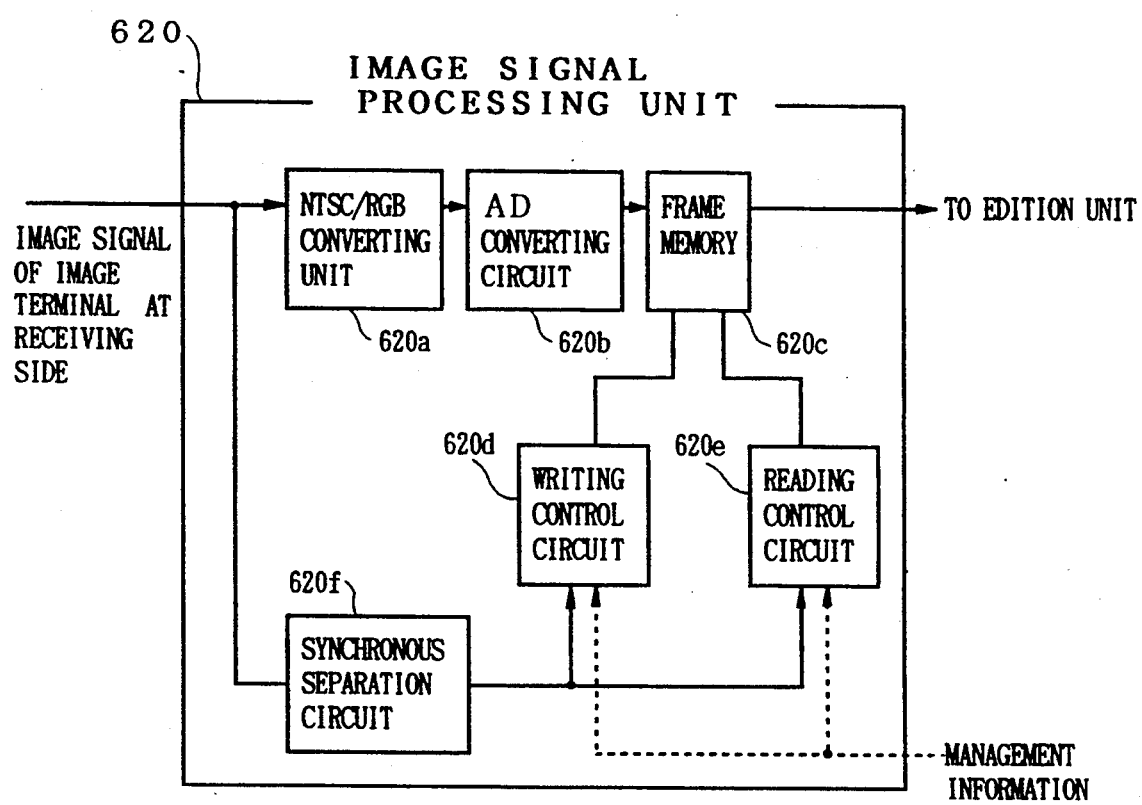
FIG. 19 shows an image signal processing unit at the terminal side.

FIG. 19 shows an internal structural block diagram of the terminal side image signal processing unit 620.

In this figure, the terminal side image signal processing unit 620 comprises an NTSC/RGB converting circuit 620a, an A/D converting circuit 620b, a frame memory 620c, a synchronous separation circuit 620f, a writing control circuit 620d and a reading control circuit 620e.

The above mentioned NTSC/RGB converting circuit 620a converts a video signal of an analog signal (hereinafter referred to as an NTSC signal) to an analog RGB signal.

The A/D converting circuit 620b has a function to convert the analog RGB signal to a digital RGB signal.

The reading control circuit 620c has a function to read the image signal out of the frame memory 620c.

The synchronous separation circuit 620f has a function to divide the vertical synchronous signal, the horizontal synchronous signal and the sampling clock signal from the image signal supplied to the terminal side image signal processing unit 620 in question. Further, it supplies the vertical synchronous signal, the horizontal synchronous signal and the sampling clock signal to the writing control circuit 620d and the reading control circuit 620e as well as to the edition unit 630.

The writing control circuit 620d has a function to reduce into one-quarter the image signal supplied from the image terminal device 4 at the receiving side, a function to determine an address of each dot in the image signal in question, and a function to determine an address of each dot in the frame memory 620c in accordance with that address and the management information. A practical example thereof will be described below.

Figure 20:
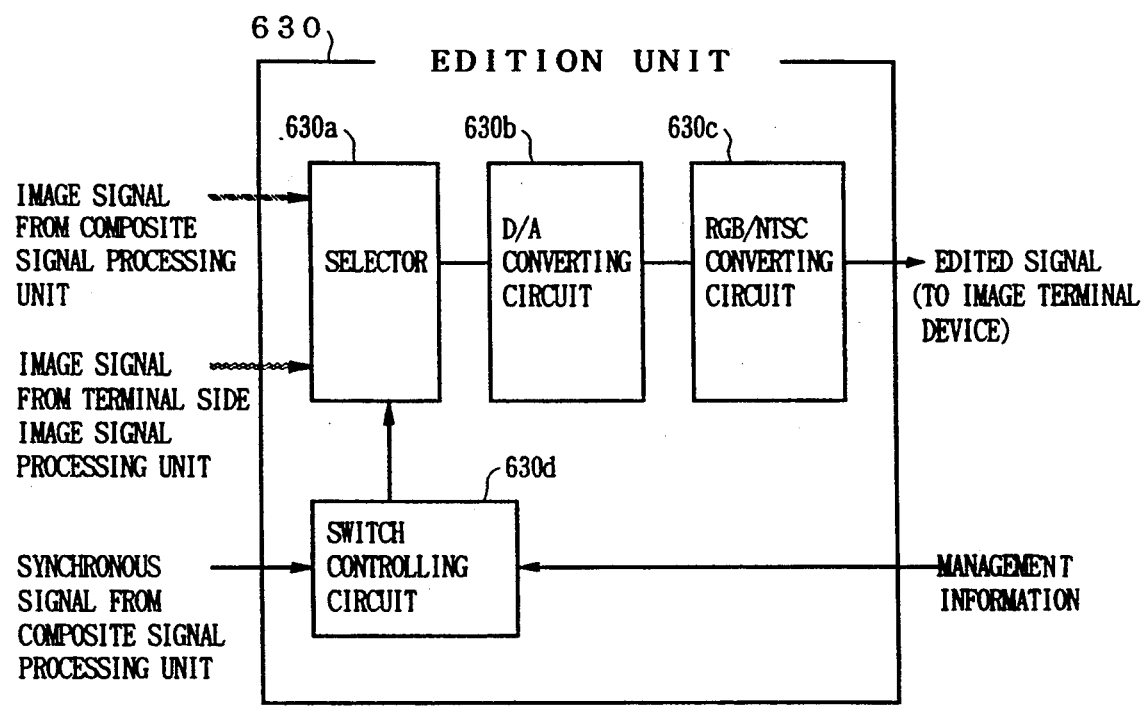
FIG. 20 is an internal structural block diagram of an editing unit according to the third embodiment.

FIG. 20 is an internal structural block diagram of the edition unit 630 in the present embodiment 3.

In this figure, the edition unit 630 comprises a selector 630a, a D/A converting circuit 630b, an RGB/NTSC converting circuit 630c and a switch controlling circuit 630d.

The selector 630a is a circuit for switching either to produce the image signal supplied from the composite signal processing unit 610 or to produce the image signal supplied from the terminal side image signal processing unit 620.

The D/A converting circuit 630b has a function to convert the digital RGB signal supplied from the selector 630a into the analog RGB signal.

The RGB/NTSC converting circuit 630c is a circuit for converting the analog RGB signal supplied from the D/A converting circuit 630b into the analog NTSC signal.

The switch controlling circuit 630d is for controlling switching operation of the selector 630a and is a circuit for generating a switching operational command in accordance with the vertical synchronous signal, the horizontal synchronous signal and the clock signal. That is, it recognizes address information of an arbitrary dot to determine either the RGB value of the dot in question it to be entered from the composite signal processing unit 610 or it is to be entered from the terminal side image signal processing unit 620, generate the switching operational command, and supplies this switching operational command to the selector 630a. Detailed description thereof will be made below.

Figure 21:
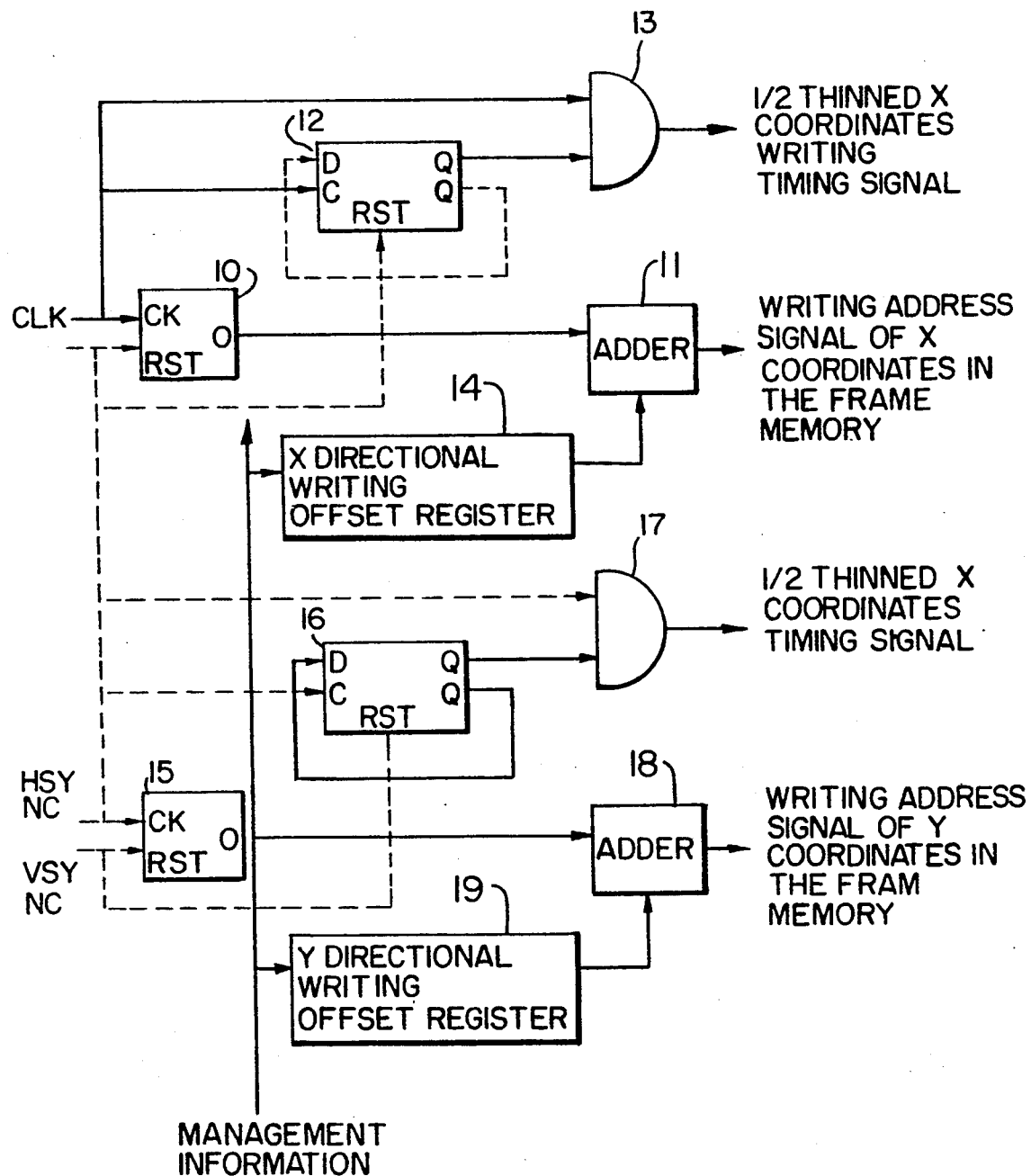
FIG. 21 is an internal structural block diagram of a writing control circuit.

Now, an internal processing of the writing control circuit 620d is described with reference to FIG. 21.

The writing control circuit 620d supplies into a type D flip-flop 12 the sampling clock signal (CLK) and the horizontal synchronous signal (HSYNC) supplied from the synchronous separation circuit 620f. An output of the type D flip-flop 12 is connected to one input terminal of an AND gate 13. To the other input terminal of the AND gate 13 supplied is the sampling clock signal. Thereby, the AND gate 13 is capable of producing an X coordinates writing timing signal. An output cycle of the X coordinates writing timing signal is as double as a cycle at which the sampling clock signal (CLK) is generated.

On the other hand, the horizontal synchronous signal (HSYNC) and the vertical synchronous signal (VSYNC) supplied from the synchronous separation circuit 620f is supplied to a type D flip-flop 16. An output of this type D flip-flop 16 is connected to one input terminal of an AND gate 17. To the other input terminal of the AND gate 17 supplied is the horizontal synchronous signal (HSYNC). Thereby, the AND gate 17 is capable of producing a Y coordinates writing timing signal. An output cycle of the Y coordinates writing timing signal is as double as a cycle at which the horizontal synchronous signal (HSYNC) is generated.

Further, the writing control circuit 620d comprises an X coordinates counter 10, an adder 11, an X directional writing offset register 14, a Y coordinates counter 15, an adder 18 and a Y directional writing offset register 19.

The above mentioned X coordinates register 10 generates, in accordance with the sampling clock signal (CLK) and the horizontal synchronous signal (HSYNC), an X coordinates address signal of each dot in a terminal side image signal to supply this X coordinates address signal to the adder 11.

The X directional writing offset register 14 has a function to register an offset value of an X coordinates transmitted from the management information processing unit 50 and a function to supply this offset value to the adder 11.

The adder 11 adds the X coordinates address and the X coordinates offset value in the terminal side image signal to generate the X coordinates address signal of each dot in the frame memory 620c. More particularly, concerning to a given dot, the X coordinates register 10 produces "x1" as the X coordinates address of said dot in the image signal and the adder 11 calculates "x1+k" if the X directional writing offset value is "k". This "x1+k" is the X coordinates address in the frame memory 620c of a dot of said dot.

The Y coordinates counter 15 generates, in accordance with the horizontal synchronous signal (HSYNC) and the vertical synchronous signal (VSYNC), a Y coordinates address signal of each dot in the terminal side image signal to supply this Y coordinates address signal to the adder 18.

The Y directional writing offset register has a function to register an offset value of Y coordinates transmitted from the management information processing unit 50 and a function to supply this offset value to the adder 18. Then, it generates the Y coordinates address signal of each dot in the frame memory 620c in the same manner as the X coordinates.

According to the writing control circuit 620d, the X coordinates writing timing signal is generated once for every two generation of the sampling clock signal (CLK) while the Y coordinates writing timing signal is generated once for every two generation of the horizontal synchronous signal (HSYNC). This means that writing a dot (X, Y) is made once for every two generation of the sampling clock signal (CLK) and the horizontal synchronous signal (HSYNC). Thereby, the image signal is thinned into ¼ and written in the frame memory 620c.

Figure 22:
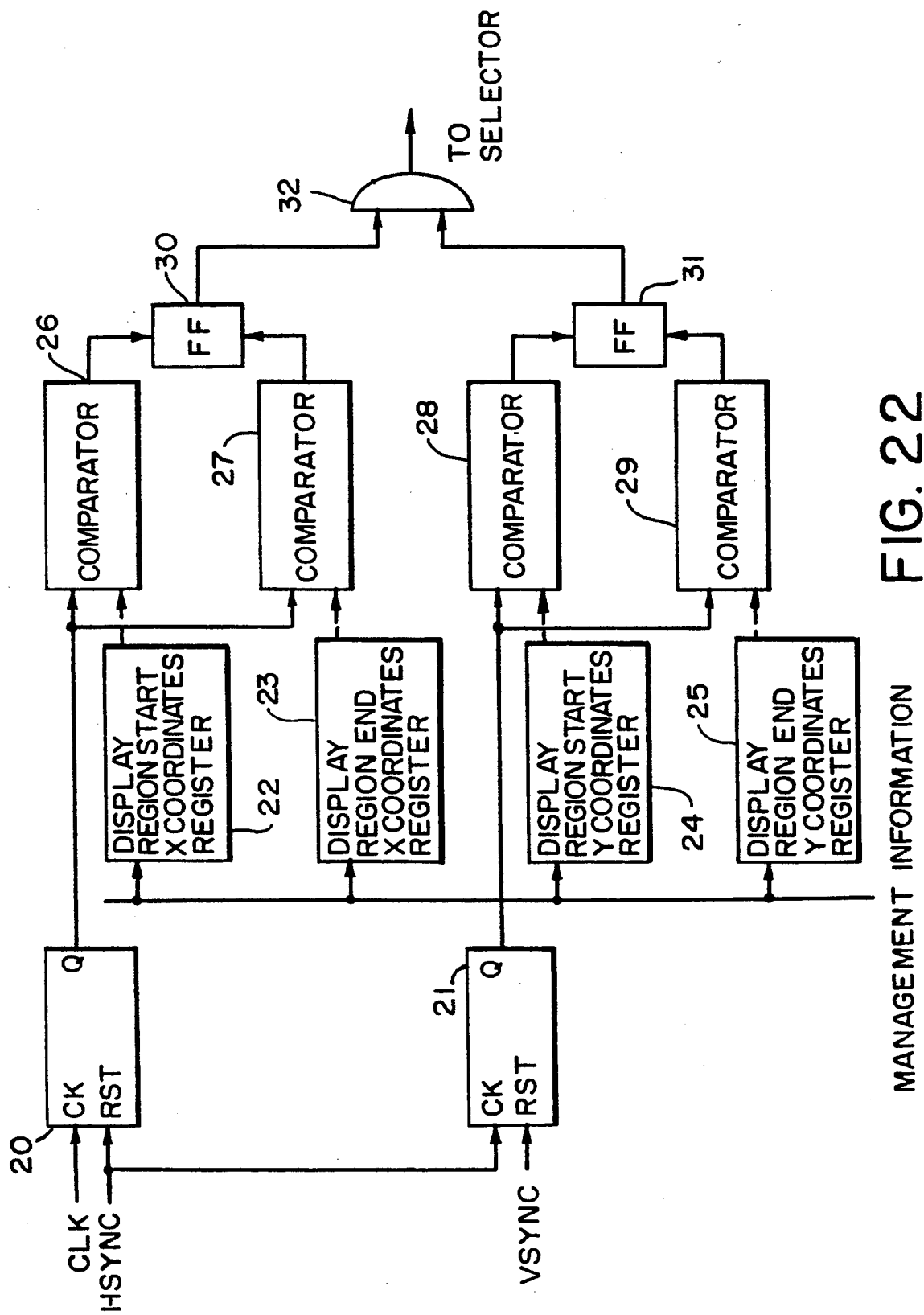
FIG. 22 is an internal structural block diagram of a switch controlling circuit.

FIG. 22 shows an internal structural block diagram of the switch controlling circuit 630d in the third embodiment.

A capacity of the displayed signal which is to be transmitted to the image terminal device 4 at the receiving side is 352×288 dots, equivalent to the composite signal. The format of the image signal is divided into four screen regions that are same as the composite signal.

An X coordinates counter 20 receives the sampling clock signal (CLK) and the horizontal synchronous signal (HSYNC) supplied from the composite processing unit 610 to produce the Y coordinates address signal of a displayed signal in accordance with these signals.

A display region start X coordinates register 22, a display region end X coordinates register 23, a display region start Y coordinates register 24 and a display region end Y coordinates register 25 have a function to specify a valid region of a composite displayed signal obtained by composing the image signal supplied from the composite signal processing unit 610 and the image signal supplied from the terminal side image signal processing unit 620. This is described in conjunction with a practical example shown in FIG. 23.

Figure 23:
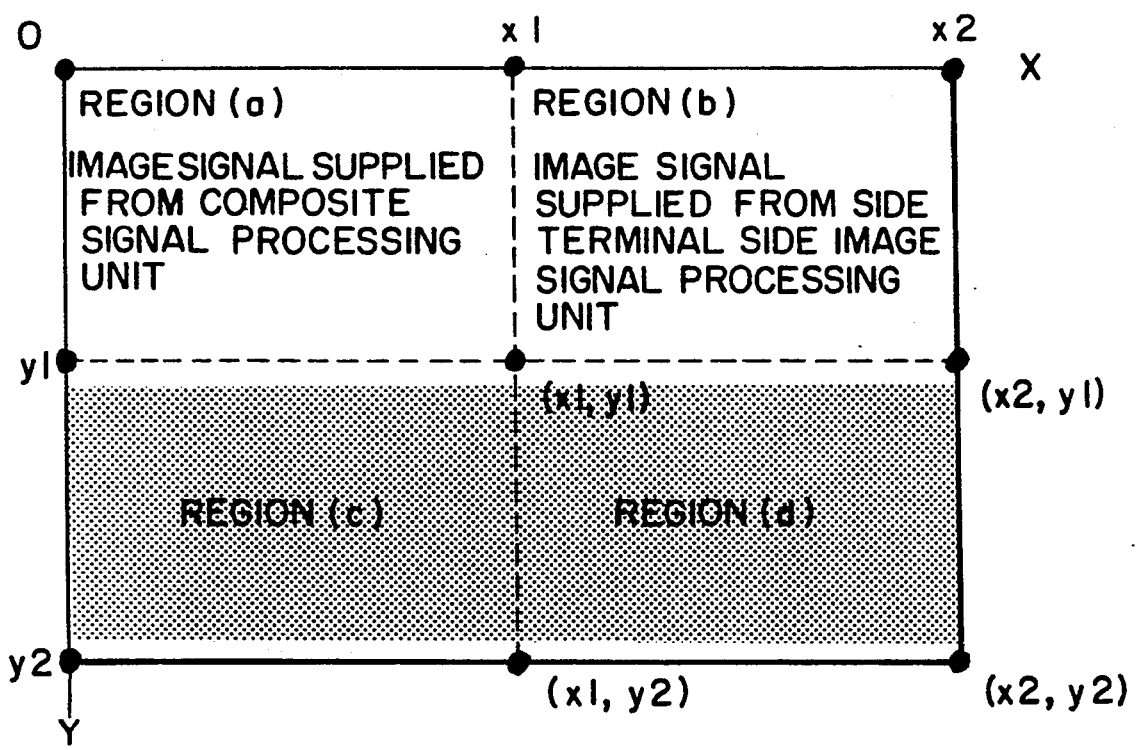
FIG. 23 is a practical example of a composite display signal.
Figure 24:
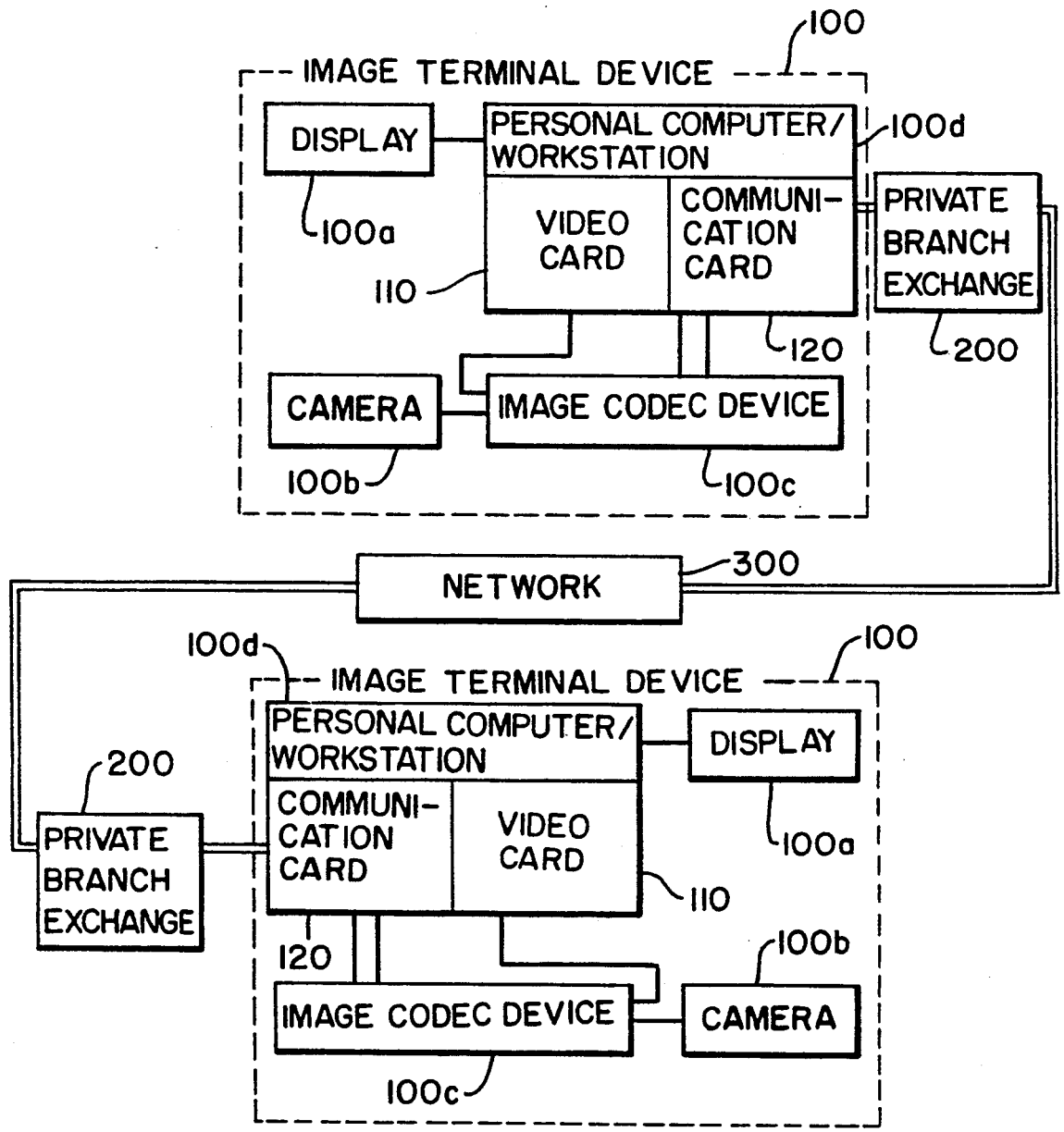
FIG. 24 is a structural block diagram of a conventional image communication system.

FIG. 23 is a view showing a practical example of a case where the image signal supplied from the composite signal processing unit 610 is composed with the region (a) of the displayed composite signal while the image signal supplied from the terminal side image signal processing unit 620 is composed with the region (b) of the displayed composite signal.

The valid region of the region (a) is $\{X|0 \leq X \leq x1, Y|0 \leq Y \leq y1\}$ while the valid region of the region (b) is $X|x1 \leq X \leq x2, Y|0 \leq Y \leq y1\}$.

In such a case, "0" is registered in the display region start X coordinates register 22 while "x1" is registered in the display region end X coordinates register 23.

On the other hand, "0" is registered in the display region start Y coordinates register 24 while "y1" is registered in the display region end Y coordinates register 25.

Next, an output of said X coordinates counter 20 and an output of the display region start X coordinates counter 22 in FIG. 22 are supplied to a comparator 26. The comparator 26 supplies a set signal to a flip-flop (FF) 30 when output values of them are coincident.

In addition, an output of said X coordinates counter 20 and an output of the display region end X coordinates counter 23 are supplied to a comparator 27. The comparator 27 supplies a reset signal to the flip-flop (FF) 30 when output values of them are coincident. Further, an output value of the flop-flop (FF) 30 is connected to one input terminal of an AND gate 32.

On the other hand, an output of said Y coordinates counter 21 and an output of the display region start Y coordinates counter 24 are supplied to a comparator 28. The comparator 28 supplies a set signal to a flip-flop (FF) 31 when output values of them are coincident.

In addition, an output of said Y coordinates counter 21 and an output of the display region end Y coordinates counter 25 are supplied to a comparator 29. The comparator 29 supplies a reset signal to the flip-flop (FF) 31 when output values of them are coincident. Further, an output of the flop-flop (FF) 31 is connected to other input terminal of an AND gate 32.

With the switch controlling circuit 630d in question, it is possible to produce a read signal/read interference signal from the frame memory 610c or the frame memory 620c to the composite displayed signal. In response to the read signal, the selector 630a reads the image signal out of the frame memory 610c (or the frame memory 620c). The selector 630a switches, in accordance with the management information, the object to be read out, i.e., switches between reading out of the frame memory 610c and reading out of the frame memory 620c.

As mentioned above, according to the third embodiment, in case where the image signal is transmitted to the image terminal device 4 at the receiving side, it is possible to transmit an image signal obtained by composing the image signal of the image terminal device 4 in question at the receiving side and the image signal of the image terminal device 4 at the transmitting side.

When the region of the composite signal is divided into N (natural number) regions, the number of the image edition units 600 may be equal in number to N. N or more image edition units 600 can also be applied.

According to the present embodiments, four image signal can be transmitted simultaneously to a single transmission path and the image cordic section can be shared with a plurality of image terminal devices.

In addition, it is possible to display an image to be transmitted to the destination simultaneously with the image of the destination.

While the above mentioned embodiments have thus been described in conjunction with a one-to-one communication, it is applicable to a one-to-plural communication. For example, in case where four image signals are composed and transmitted, one-to-one through one-to-four communications are allowable. For one-to-four, the image signal of four destination image terminal devices are displayed on a window of the image terminal device at the receiving side.

Further, the image terminal device 4 may be provided with a function to transmit arbitrary information to the image communication processing device 5. In such a case, it is preferably performed through packet communication by using the D channel of the first subscriber line 7. More particularly, for reducing and displaying the image signal received at any image terminal 4, when the image signal reduced into, for example, ¼ on transmission is further reduced into ½ to be displayed on the display device, the difference between ¼ image signal and ⅛ image signal are transmitted in vain. With this respect, the image terminal device 4 transmits the reduction rate in question to the image communication processing device 5 by using the D channel of the first subscriber line 7.

The image communication processing device 5 reduces, on generating a composite signal, the image signal directed to the image terminal device 4 in question into said reduction rate. Then, the reduced image signal is composed with the composite signal and transmitted to the image terminal device 4 in question, thereby the transmission path can be effectively used.

What is claimed is:

1. A method for controlling image communication between a plurality of terminals and an exchange, the method comprising the steps of providing an image communication processing device between the plurality of terminals and the exchange;

picking up an image to be transmitted by each terminal, and entering an image signal into said terminal and transmitting by each terminal the image signal entered at said image picking-up step; and in said image communication processing device, reducing an image signal transmitted from each of said terminals, composing an image signal reduced at said reducing step, and transmitting the composite signal composed at said composing step to destination terminals of each of said terminals through said exchange.

2. A method for controlling image communication as claimed in claim 1, wherein an image destination processing device is provided between said destination terminals and said exchange; and wherein when said composite signal is transmitted from said image communication processing device, a destination terminal of each image signal composed into said composite signal is determined, and said composite signal is transmitted to each destination terminal determined at said destination determining step.

3. A method for controlling image communication as claimed in claim 2, wherein said destination terminal carries out:
  a communication processing step for receiving said composite signal transmitted from said image destination processing device;
  an image signal extracting step for extracting the image signal from the composite signal received at said communication processing step; and
  a displaying step for displaying the image signal extracted at said image signal extracting step on a given screen region.

4. A method for controlling image communication as claimed in claim 3, wherein said communication processing step comprises the step of:
  transmitting the image signal entered at said image picking-up step and destination information which indicates a destination terminal to said image communication processing device.

5. A method for controlling image communication as claimed in claim 1, wherein said each terminal further carries out:
  a communication processing step for transmitting the image signal entered at said image picking-up step, destination information of said image signal, and a desired reduction rate to said image communication processing device.

6. A method for controlling image communication as claimed in claim 5, wherein said image communication processing device further carries out:
  a transmission step for transmitting said composite signal composed at said composing step, and also destination information of each said image signal, and a reduction rate to an image destination processing device.

7. A method for controlling image communication as claimed in claim 6, wherein when said composite signal, destination information, and reduction rate are received from said image communication processing device, said image destination processing device carries out:
  a step for determining a destination terminal according to said destination information;
  a step for transmitting said composite signal to said destination terminal;
  a reducing step for reducing the image signal received from said destination terminal according to said reduction rate;
  a composing step for composing an image signal reduced at said reducing step; and
  a transmission step for transmitting said composite signal composed at said composing step to said image communication processing device.

8. A method for controlling image communication as claimed in claim 1, wherein when a communication request is received from a predetermined terminal, said image communication processing device carries out:
  a step for determining whether a call is set between the image communication processing device and an image destination processing device; and
  a step for setting a call to said image destination processing device, if a call is not set between said image communication processing device and said image destination processing device.

9. A method for controlling communication as claimed in claim 8, wherein when a communication completion notification is received from a predetermined terminal, said image communication processing device carries out:
  a step for determining whether there is a terminal under a communication state other than one terminal; and
  a step for disconnecting the call set to said image destination processing device if there is no terminal under the communication state other than the one terminal.

10. A method for controlling image communication as claimed in claim 1, wherein an image destination processing device is provided, which carries out:
  a dividing step for dividing the composite signal received from said image communication processing device;
  a destination determining step for determining destination terminals of each image signal divided at said dividing step; and
  a transmission step for transmitting each image signal divided at said dividing step to each destination terminal determined at said destination determining step.

11. A method for controlling image communication as claimed in claim 1, wherein an image destination processing device is provided, which carries out:
  a dividing step for dividing a first image signal from the composite signal received from said image communication processing device;
  a destination determining step for determining a destination terminal of the first image signal divided at said dividing step in accordance with destination information;
  a step for determining a second image signal transmitted from said destination terminal of said first image signal; and
  a transmission step for transmitting to said destination terminal said second image signal.

12. A method for controlling image communication as claimed in claim 11, wherein said destination terminal carries out:
  a displaying step for simultaneously displaying said first image signal and said second image signal transmitted from said image destination processing device.

13. A method for controlling image communication as claimed in claim 11, wherein said image destination processing device carries out:
  a composing step for composing said first image signal and said second image signal.

14. An apparatus for controlling image communication, comprising an image communication processing device provided between a plurality of terminals and an exchange, each said terminal comprising:
  an image pick-up means for picking up an image to be transmitted and entering an image signal into said terminal; and
  a communication processing means for transmitting the image signal entered by said image pick-up means,
  said image communication processing device comprising:
  a reducing means for reducing an image signal transmitted from each of said terminals;
  a composing means for composing an image signal reduced by said reducing means; and a transmission means for transmitting the composite signal composed by said composing means to a destination terminal of each said terminal through said exchange.

15. An apparatus for controlling image communication as claimed in claim 14, and comprising an image destination processing device provided between destination terminals and an exchange, said image destination processing device comprising:
- a destination determining means for determining destination terminals of each image signal composed into said composite signal, when said composite signal is transmitted from said image communication processing device; and
- a transmission means for transmitting said composite signal to each destination terminal determined by said destination determining means.

16. An apparatus for controlling image communication as claimed in claim 15, wherein said each destination terminal comprises:
- a communication processing means for receiving said composite signal transmitted from said image destination processing device;
- an image signal extracting means for extracting the image signal from said composite signal received by said communication processing means; and
- a displaying means for displaying the image signal extracted in said extracted means on a given screen region.

17. An apparatus for controlling image communication as claimed in claim 16, wherein said image communication processing means transmits said image signal entered by said image pick-up means and destination information which designates a destination terminal to said image communication processing device.

18. An apparatus for controlling image communication as claimed in claim 15, wherein said transmission means of said image communication processing device transmits destination information of each image signal and a reduction rate to said image destination processing device.

19. An apparatus for controlling image communication as claimed in claim 18, wherein said image destination processing device further includes a reducing means for reducing an image signal received from a destination terminal according to said reduction rate, and a composing means for composing an image signal reduced by said reducing means, and transmission means for transmitting said composite signal to said image communication processing device.

20. An apparatus for controlling image communication as claimed in claim 18, wherein when a communication request is received from a predetermined terminal, said image communication processing device determines whether a call is set between said image communication processing device and said image destination processing device,
and if the call is not set between said image communication processing device and said image destination processing device, the image communication processing device sets a call to said image destination processing device.

21. An apparatus for controlling image communication as claimed in claim 20, wherein when a communication completion notification is received from a predetermined terminal, said image communication processing device determines whether there is a terminal under a communication state other than one terminal,
and if there is no terminal under the communication state other than said one terminal, the image communication processing device disconnects the call set to said image destination processing device.

22. An apparatus for controlling image communication as claimed in claim 14, and comprising a destination image processing device which comprises:
- a dividing means for dividing the composite signal received from said image communication processing device;
- a destination determining means for determining a destination terminal of each image signal divided by said dividing means; and
- a transmission means for transmitting each image signal divided by said dividing means to the each destination terminal determined by said destination determining means.

23. An apparatus for controlling image communication as claimed in claim 14, and further comprising an image destination processing device which comprises:
- a dividing means for dividing a first image signal from the composite signal received from said image communication processing device;
- a destination determining means for determining destination terminal of the first image signal divided by said dividing means in accordance with destination information; and
- a transmission means for transmitting to said destination terminal the first image signal and a second image signal transmitted from said image communication processing device.

24. An apparatus for controlling image communication as claimed in claim 23, wherein said destination terminal comprises:
- a displaying means for simultaneously displaying the first image signal and the second image signal transmitted from said image communication processing device.

25. An apparatus for controlling image communication as claimed in claim 23, wherein said image destination processing device comprises:
- a composing means for composing said first image signal and said second image signal.

* * * * *